(12) United States Patent
Li et al.

(10) Patent No.: US 10,566,630 B2
(45) Date of Patent: Feb. 18, 2020

(54) ENCAPSULATED SULFUR CATHODES FOR RECHARGEABLE LITHIUM BATTERIES

(71) Applicant: The Board of Trustees of the Leland Stanford Junior University, Stanford, CA (US)

(72) Inventors: Weiyang Li, Sunnyvale, CA (US); Yi Cui, Stanford, CA (US); Zhi Wei Seh, Stanford, CA (US); Guangyuan Zheng, Stanford, CA (US); Yuan Yang, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 16/039,165

(22) Filed: Jul. 18, 2018

(65) Prior Publication Data
US 2019/0081327 A1    Mar. 14, 2019

Related U.S. Application Data

(63) Continuation of application No. 15/404,058, filed on Jan. 11, 2017, now Pat. No. 10,056,618, which is a
(Continued)

(51) Int. Cl.
*H01M 4/76*      (2006.01)
*H01M 4/136*     (2010.01)
(Continued)

(52) U.S. Cl.
CPC .............. *H01M 4/76* (2013.01); *H01G 11/24* (2013.01); *H01G 11/30* (2013.01); *H01M 4/136* (2013.01);
(Continued)

(58) Field of Classification Search
CPC .. H01M 4/76; H01M 10/0525; H01M 4/5815; H01M 4/622; H01M 4/621;
(Continued)

(56) References Cited

U.S. PATENT DOCUMENTS 4,808,496 A    2/1989  Hope et al.
6,703,163 B2   3/2004  Ogura et al.
(Continued)

FOREIGN PATENT DOCUMENTS

| CN | 1547276 A | 11/2004 |
|---|---|---|
| CN | 102738448 A | 10/2012 |
| EP | 1 233 464 A1 | 8/2002 |
| WO | WO-99/33131 A1 | 7/1999 |
| WO | WO-2009/114314 A2 | 9/2009 |
| WO | WO-2010/053923 A1 | 5/2010 |
| WO | WO-2011/059766 A1 | 5/2011 |

OTHER PUBLICATIONS

Advisory Action in U.S. Appl. No. 13/612,493, dated Nov. 4, 2016.
(Continued)

*Primary Examiner* — Lisa S Park
(74) *Attorney, Agent, or Firm* — Foley & Lardner LLP; Cliff Z. Liu

(57) ABSTRACT

A method of forming a sulfur-based cathode material includes: 1) providing a sulfur-based nanostructure; 2) coating the nanostructure with an encapsulating material to form a shell surrounding the nanostructure; and 3) removing a portion of the nanostructure through the shell to form a void within the shell, with a remaining portion of the nanostructure disposed within the shell.

5 Claims, 22 Drawing Sheets

Related U.S. Application Data continuation of application No. 13/612,493, filed on Sep. 12, 2012, now abandoned.

(60) Provisional application No. 61/533,740, filed on Sep. 12, 2011, provisional application No. 61/693,677, filed on Aug. 27, 2012.

(51) Int. Cl.
| | |
|---|---|
| *H01M 4/58* | (2010.01) |
| *H01M 4/62* | (2006.01) |
| *H01M 4/1397* | (2010.01) |
| *H01M 10/052* | (2010.01) |
| *H01M 10/0525* | (2010.01) |
| *H01G 11/24* | (2013.01) |
| *H01G 11/30* | (2013.01) |
| *B82Y 30/00* | (2011.01) |

(52) U.S. Cl.
CPC ......... *H01M 4/5815* (2013.01); *H01M 4/621* (2013.01); *H01M 4/622* (2013.01); *H01M 10/052* (2013.01); *H01M 10/0525* (2013.01); *B82Y 30/00* (2013.01); *H01M 4/1397* (2013.01); *H01M 4/625* (2013.01); *H01M 4/626* (2013.01); *H01M 4/765* (2013.01); *Y02E 60/13* (2013.01)

(58) Field of Classification Search
CPC .... H01M 10/052; H01M 4/136; H01M 4/626; H01M 4/625; H01M 4/1397; H01M 4/765; H01M 10/0567; H01M 4/581; H01G 11/30; H01G 11/24; Y02E 60/13; B82Y 30/00
See application file for complete search history.

(56) References Cited

U.S. PATENT DOCUMENTS

| | | | |
|---|---|---|---|
| 7,060,390 B2 | 6/2006 | Chen et al. | |
| 2003/0003360 A1 | 1/2003 | Gorkovenko et al. | |
| 2003/0099884 A1 | 5/2003 | Chiang et al. | |
| 2005/0175895 A1* | 8/2005 | Gorkovenko | H01M 4/0485 429/218.1 |
| 2006/0115579 A1 | 6/2006 | Mukherjee et al. | |
| 2007/0237990 A1 | 10/2007 | Kim | |
| 2007/0287060 A1 | 12/2007 | Naoi et al. | |
| 2009/0162750 A1 | 6/2009 | Kawakami et al. | |
| 2010/0053923 A1 | 3/2010 | Matsui et al. | |
| 2010/0056366 A1 | 3/2010 | Lee | |
| 2010/0258759 A1 | 10/2010 | Archer et al. | |
| 2010/0330421 A1 | 12/2010 | Cui et al. | |
| 2011/0091773 A1 | 4/2011 | Wei | |
| 2011/0177398 A1 | 7/2011 | Affinito et al. | |
| 2011/0200883 A1 | 8/2011 | Cui et al. | |
| 2012/0183843 A1 | 7/2012 | Kawasaki et al. | |
| 2012/0264017 A1* | 10/2012 | Nazri | H01M 4/0423 429/218.1 |
| 2013/0164615 A1* | 6/2013 | Manthiram | H01B 1/122 429/212 |
| 2013/0224594 A1* | 8/2013 | Yushin | H01M 4/38 429/218.1 |
| 2013/0330619 A1 | 12/2013 | Archer et al. | |

OTHER PUBLICATIONS

Arico et al., "Nanostructured materials for advanced energy conversion and storage devices." Nat. Mat. 4:366-377 (2005).
Aurbach et al., "On the surface chemical aspects of very high energy density, rechargeable Li-sulfur batteries." J. Electro. Chem. Soc. 156:8, A694-A702 (2009).
Barchasz, et al., "New insights into the limiting parameters of the Li/S rechargeable cell." J. Power Sources. 199, 322-330 (2012).
Bruce et al., "Li-O2 and Li-S batteries with high energy storage." Nat. Mat. 11:19-29 (2011).
Chan et al., "High-performance lithium battery anodes using silicon nanowires." Nanotechnology vol. 3, 31-35 (2008).
Chen Z. et al., "Role of Surface Coating on Cathode Materials for Lithium-ion Batteries," Journal of Materials Chemistry, (2010), 20, pp. 7606-7612.
Chung et al., "Electronically conductive phosphor-olivines as lithium storage electrodes." Nat. Mat. 1, 123-128 (2002).
Deng, et al., "Green energy storage materials: Nanostructured TiO2 and Sn-based anodes for lithium-ion batteries." Energy Environ. Sci. 2, 818-837 (2009).
Diao, et al., "Analysis of polysulfide dissolved in electrolyte in discharge-charge process of Li-S battery." J. Electrochem. Soc. 159:4, A421-A425 (2012).
Elazari, et al., "Sulfur-impregnated activated carbon fiber cloth as a binder-free cathode for rechargeable Li-S batteries." Adv. Mat. 23:5641-5644 (2011).
European Patent Office Examination Report dated Nov. 4, 2015, from European patent application No. 12831950.6.
Final Office Action in U.S. Appl. No. 13/612,493, dated Aug. 11, 2016.
Final Office Action in U.S. Appl. No. 13/612,493, dated Nov. 6, 2015.
First Chinese Office Action dated Oct. 21, 2015, from Chinese patent application 201280050330.0.
Fu et al., "Core-shell structured sulfur-polypyrrole composite cathodes for lithiumsulfur batteries." RSC Advances 2, 5927-5929 (2012).
Goodenough, et al., "Challenges for rechargeable Li batteries." Chem. Mater. 22, 587-603 (2010).
Guo et al., "Sulfur-impregnated disordered carbon nanotubes cathode for lithium-sulfur batteries." Nano Lett. 11, 4288-4294 (2011).
Jayaprakash et al., "Porous hollow carbon@sulfur composites for high-power lithium-sulfur batteries." Agnew. Chem. Int. Ed. 50 5904-5908 (2011).
Jayaprakash, N. et al. (2011) "Porous Hollow Carbon@Sulfur Composites for High-Power Lithium-Sulfur Batteries," Angew. Chem. 123:6026-6030.
Ji et al., Advances in Li-S batteries. J. Mater. Chem. 20 9821-9826 (2010).
Ji et al., "Graphene oxide as a sulfur immobilizer in high performance lithium/sulfur cells." J. Am. Chem. Soc. 133 18522-18525(2011).
Ji et al., "Recent developments in nanostructured anode materials for rechargeable lithium-ion batteries." Energy Environ. Sci., 4, 2682 (2011).
Ji et al., "Stabilizing lithium-sulphur cathodes using polysulphide reservoirs." Nat. Comm. 2, 325 (2011).
Ji, et al., "A highly ordered nanostructured carbon-sulphur cathode for lithium-sulphur batteries", Nature Materials, vol. 8, pp. 500-506, (2009).
Ji, et al., "Advances in Li-S batteries", Journal of Materials Chemistry, 20: 9821-9826, (2010).
Ji, et al., "Stabilizing lithium-sulphur cathodes using polysulphide reservoirs", Nature Communications, pp. 1-7, (2011).
Kang et al., "Battery materials for ultrafast charging and discharging." Nat. Lett. 458, 190-193 (2009).
Kasavajjula et al., "Nano- and bulk-silicon-based insertion anodes for lithium-ion secondary cells." J. Power Sources 163, 1003-1039 (2007).
Kim et al., "Microstructural changes of microemulsion-mediated TiO2 particles during calcination." Mat. Lett. 49, 244-249 (2001).
Kumar, et al., "Carbonaceous anode materials for lithium-ion batteries—the road ahead", Journal of the Indian Institute of Science, vol. 89:4, pp. 393-424, (2009).
Lai et al., "Synthesis and electrochemical performance of sulfur/highly porous carbon composites." J. Phys. Chem. C 113, 4712-4716 (2009).
Lee et al., "Fabricating genetically engineered high-power lithium ion batteries using multiple virus genes." Science 324, 1051-1055 (2009).

(56) References Cited

OTHER PUBLICATIONS

Li et al., "Hollow core-shell structured porous Si-C nanocomposites for Li-ion battery anodes." J. Mater. Chem. 22, 11014 (2012).
Liang X. et al., "A Nano-Structured and Highly Ordered Polypyrrole-Sulfur Cathode for Lithium-Sulfur Batteries," Journal of Power Sources, (2010), 196:16, pp. 6951-6955.
Liang, et al., "Hierarchically structured sulfur/Carbon Nanocomposite material for high-energy lithium battery", Chem. Mater., 21: 4724-4730, (2009).
Magasinski, et al., "High-performance lithium-ion anodes using a hierarchical bottom-up approach." Nat. Mater. vol. 9, 353-359 (2010).
Mikhaylik et al., "Polysulfide shuttle study in the Li/S battery system." J. Electrochem. Soc. 151:11, A1969-A1976 (2004).
Nishizawa et al., Template synthesis of polypyrrole-coated spinel LiMn2O4?O?4 nanotubules and their properties as cathode active materials for lithium batteries. J. Electrochem. Soc. 144:6, 1923-1927 (1997).
Non-Final Office Action in U.S. Appl. No. 13/612,493, dated Apr. 7, 2016.
Non-Final Office Action in U.S. Appl. No. 13/612,493, dated May 8, 2015.
Park et al., "Li-alloy based anode materials for Li secondary batteries." Chem.. Soc. Rev. 39:3115-3141 (2010).
Park, et al., "Silicon nanotube battery anodes", Nano Letters, vol. 9, No. 11, pp. 3844-3847, (2009).
Schaefer, et al., "Electrolytes for high-energy lithium batteries", Appl. Nanosci., 2: 91-109, (2012).
Schuster et al., "Spherical ordered mesoporous carbon nanoparticles with high porosity for lithium-sulfur batteries." Agnew. Chem. Int. Ed. 51, 3591-3595 (2012).
Search Report from PCT/US2012/054908 dated Feb. 15, 2013.
Su et al., "Li ion battery materials with core-shell nanostructures." Nanoscale 3, 3967 (2011).
U.S. Notice of Allowance on U.S. Appl. No. 15/404,058 dated May 4, 2018.
U.S. Office Action on U.S. Appl. No. 15/404,058 dated Dec. 21, 2017.
Wang et al., "A novel conductive polymer-sulfur composite cathode material for rechargeable lithium batteries." Adv. Mater. 14:13-14 (2002).
Wang et al., "Graphene-wrapped sulfur particles as a rechargeable lithium-sulfur battery cathode materials with high capacity and cycling stability." Nano Lett. 11, 2644-2647 (2011).
Wang, et al., "Graphene-wrapped sulfur particles as a rechargeable lithium-sulfur-battery cathode material with high capacity and cycling stability", Department of Chemistry and Department of Material Science and Engineering, pp. 1-15, (2009).
Whittingham, "Lithium batteries and cathode materials." Chem. Rev. 104, 4271-4301 (2004).
Wu et al., "Sulfur/Polythiophene with a Core/Shell Structure: Synthesis and Electrochemical Properties of the Cathode for Rechargeable Lithium Batteries." J. Phys. Chem. 115, 6057-6063 (2011).
Xiao, et al., "A soft approach to encapsulate sulfur: Polyaniline nanotubes for lithium-sulfur batteries with long cycle life", Adv. Mater., 24: 1176-1181, (2012).
Yamin et al., "Lithium sulfur battery-Oxidation/reduction mechanisms of polysulfides in THF solutions." J. Electro. Chem. Soc. vol. 135:5, 1045-1048 (1988).
Yang et al., "Improving the performance of lithium-sulfur batteries by conductive polymer coating." www.acsnano.org (2011).
Yang et al., "Nanostructures and lithium electrochemical reactivity of lithium titanites and titanium oxides: a review." J. Power Sources 192, 588-598 (2009).
Yang et al., "New nanostructured Li2S/silicon rechargeable battery with high specific energy." Nano Lett. 10, 1486-1491 (2010).
Yang et al., "Towards systems materials engineering." Nat. Mat. 11:560-563 (2012).
Yang, et al., "Improving the performance of lithium—sulfur batteries by conductive polymer coating", ACSNANO, pp. A-G, (2011).
Yao et al., "Interconnected silicon hollow nanospheres for lithium-ion battery anodes with long cycle life." pubs.acs.org/NanoLett (2011).
Yao, et al., "Interconnected silicon hallow Nanoshperes for lithium-ion battery anodes with long cycle life", Nano Letters, Nano Letters, pp. A-F, (2011).
Yuan, et al., "Improvement of cycle property of sulfur-coated multi-walled carbon nanotubes composite cathode for lithium/sulfur batteries", Journal of Power Sources, 189: 1141-1146, (2009).
Zang et al., "Amorphous Microporous Titania Modified with Platinum(IV) Chloride—A New Type of Hybrid Photocatalyst for Visible Light Detoxification." J. Phys. Chem. B, 102, 10765-10771 (1998).
Zheng et al., "Hollow carbon nanofiber-encapsulated sulfur cathodes for high specific capacity rechargeable lithium batteries." Nano Lett. 4462-4467 (2011).
Zheng et al., "Novel nanosized adsorbing sulfur composite cathode materials for the advanced secondary lithium batteries." Electrochimica Acta 51, 1330-1335 (2006).

\* cited by examiner

ENCAPSULATED SULFUR CATHODES FOR RECHARGEABLE LITHIUM BATTERIES

CROSS REFERENCE TO RELATED APPLICATIONS

This application is a continuation of U.S. patent application Ser. No. 15/404,058, filed on Jan. 11, 2017, which is a continuation of U.S. patent application Ser. No. 13/612,493, filed on Sep. 12, 2012, which claims the benefit of U.S. Provisional Application Ser. No. 61/533,740, filed on Sep. 12, 2011, and the benefit of U.S. Provisional Application Ser. No. 61/693,677, filed on Aug. 27, 2012, the disclosures of which are incorporated herein by reference in their entireties.

STATEMENT REGARDING FEDERALLY SPONSORED RESEARCH OR DEVELOPMENT

This invention was made with Government support under contract DE-AC02-765F00515 awarded by the Department of Energy. The Government has certain rights in this invention.

BACKGROUND

Rechargeable batteries with high specific energy are desirable for solving imminent energy and environmental issues. Lithium-ion batteries have one of the highest specific energy among rechargeable batteries, but state-of-the-art technology based on intercalation mechanism has a theoretical specific energy of about 400 Wh/kg for both $LiCoO_2$/graphite and $LiFePO_4$/graphite systems. To achieve higher specific energy, new materials in both the cathode and anode are desired. Despite significant progress in the development of high capacity anode materials such as nanostructured silicon, the relatively low charge capacity of cathodes remains a limiting factor for commercializing rechargeable batteries with high specific energy. Current cathode materials, such as transition metal oxides and phosphates, typically have an inherent limit of about 300 mAh/g. On the other hand, sulfur-based cathodes have a theoretical capacity of about 1,673 mAh/g. Although its voltage is about 2.2 V vs $Li/Li^+$, which is about 60% of conventional lithium-ion batteries, the theoretical specific energy of a lithium-sulfur cell is about 2,600 Wh/kg, which is about five times higher than a $LiCoO_2$-graphite system. Sulfur also has many other advantages such as low cost and non-toxicity. However, the poor cycle life of lithium-sulfur batteries has been a significant hindrance towards its commercialization. The fast capacity fading during cycling may be due to a variety of factors, including the dissolution of intermediate lithium polysulfides (e.g., $Li_2S_x$, $4 \leq x \leq 8$) in the electrolyte, large volumetric expansion of sulfur (about 80%) during cycling, and the insulating nature of $Li_2S$. In order to improve the cycle life of lithium-sulfur batteries, the dissolution of polysulfides is one of the problems to tackle. Polysulfides are soluble in the electrolyte and can diffuse to the lithium anode, resulting in undesired parasitic reactions. The shuttle effect also can lead to random precipitation of $Li_2S_2$ and $Li_2S$ on the positive electrode, which can change the electrode morphology and result in fast capacity fading.

Other approaches have been attempted to address material challenges of sulfur, such as surface coating, conductive matrix, improved electrolytes, and porous carbon. For example, graphene/polymer coating has been shown to yield a smaller capacity decay. Porous carbon is another approach to trap polysulfides and provide conductive paths for electrons. Nevertheless, in the case of porous carbon, for example, a large surface area of sulfur can still be exposed to the electrolyte, which exposure can cause undesired polysulfide dissolution. Moreover, lesser emphasis has been placed on dealing with the large volume expansion of sulfur during lithiation. This volume expansion of sulfur can cause a surrounding material, such as a coating, to crack and fracture, rendering the surrounding material ineffective in trapping polysulfides.

It is against this background that a need arose to develop the sulfur-based cathodes and related methods and electrochemical energy storage devices described herein.

SUMMARY

Embodiments of the invention relate to improved sulfur-based cathodes and the incorporation of such cathodes in electrochemical energy storage devices, such as batteries and supercapacitors.

Sulfur has a high specific capacity of about 1,673 mAh/g as lithium battery cathodes, but its rapid capacity fading due to polysulfide dissolution presents a significant challenge for practical applications. Certain embodiments provide a hollow carbon nanofiber-encapsulated sulfur cathode for effective trapping of polysulfides and exhibiting high specific capacity and excellent electrochemical cycling of battery cells. The hollow carbon nanofiber arrays are fabricated using an anodic aluminum oxide ("AAO") template through thermal carbonization of polystyrene. The AAO template also facilitates sulfur infusion into the hollow fibers and substantially prevents sulfur from coating onto the exterior carbon wall. The high aspect ratio of carbon fibers provides a desirable structure for trapping polysulfides, and the thin carbon wall allows rapid transport of lithium ions. The dimension and shape of these nanofibers provide a large surface area per unit mass for $Li_2S$ deposition during cycling and reduce pulverization of active electrode materials due to volumetric expansion. In some embodiments, a stable discharge capacity of at least about 730 mAh/g can be observed at C/5 rate after 150 cycles of charge/discharge. The introduction of $LiNO_3$ additive to the electrolyte can improve the coulombic efficiency to at least about 99% at C/5 rate. The hollow carbon nanofiber-encapsulated sulfur structure can be useful as a cathode design for rechargeable lithium-sulfur batteries with high specific energy, such as at least about 500 Wh/kg, at least about 700 Wh/kg, at least about 900 Wh/kg, at least about 1,100 Wh/kg, at least about 1,300 Wh/kg, at least about 1,500 Wh/kg, at least about 1,700 Wh/kg, at least about 1,900 Wh/kg, or at least about 2,100 Wh/kg, and up to about 2,300 Wh/kg, up to about 2,400 Wh/kg, up to about 2,500 Wh/kg, or up to about 2,600 Wh/kg.

Other embodiments provide substantially monodisperse, polymer-encapsulated hollow sulfur nanoparticles, presenting a rational design to address various materials challenges. Some embodiments demonstrate high specific discharge capacities of at least about 1,179 mAh/g, at least about 1,018 mAh/g, and at least about 990 mAh/g at C/10, C/5, and C/2 rates, respectively. Excellent capacity retention can be attained, with at least about 80.3% retention after 500 cycles and at least about 60% retention after 1,000 cycles at C/2 rate. Together with the high abundance of sulfur, embodiments provide a room-temperature, one-stage aqueous solution synthesis, which is highly scalable for manufacturing of low-cost and high-energy batteries.

Further embodiments demonstrate the design of a sulfur-$TiO_2$ yolk-shell nanoarchitecture with internal void space for stable and prolonged cycling over 1,000 charge/discharge cycles in lithium-sulfur batteries. Compared to bare sulfur and sulfur-TiO$_2$ core-shell nanoparticles, the yolk-shell nanostructures can exhibit high capacity retention due to the presence of sufficient empty space to accommodate the volume expansion of sulfur, resulting in a structurally intact TiO$_2$ shell to mitigate against polysulfide dissolution. Using the yolk-shell nanoarchitecture, an initial specific capacity of at least about 1,030 mAh/g at C/2 rate and a Coulombic efficiency of at least about 98.4% over 1,000 cycles can be achieved. Moreover, the capacity decay after 1,000 cycles can be 0.033% or lower per cycle.

Other aspects and embodiments of the invention are also contemplated. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Encapsulated Sulfur Cathodes

Figure 1:
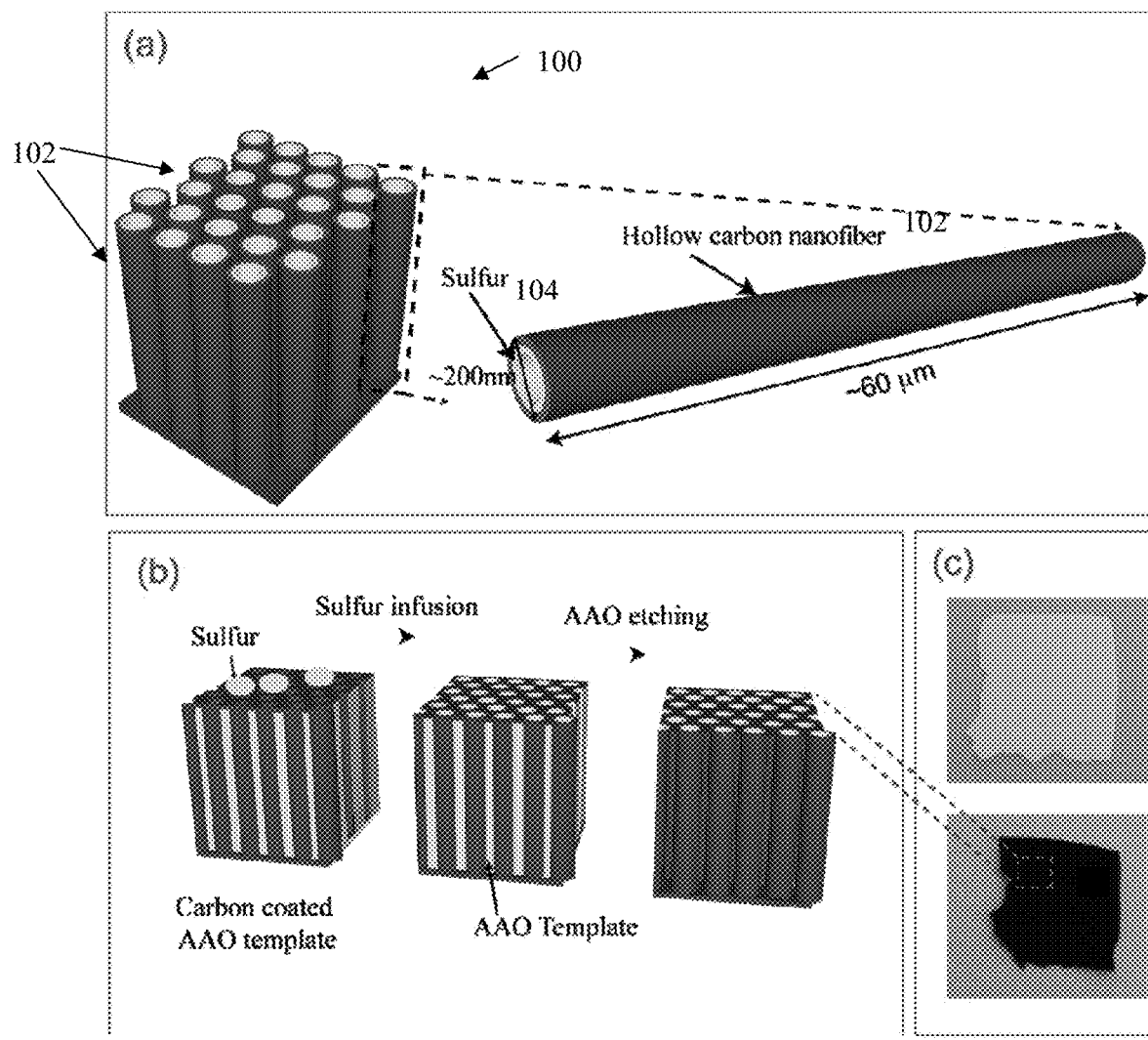
FIG. 1. Schematic of design and fabrication process of hollow carbon nanofiber-encapsulated sulfur cathode structure. (a) The design principle showing the high aspect ratio of the carbon nanofiber for effective trapping of polysulfides and (b) the fabrication process of cathode structure. (c) Digital camera images showing the contrast of AAO template before and after carbon coating and sulfur infusion.

Embodiments of the invention relate to improved sulfur-based cathode materials and the incorporation of such cathode materials in electrochemical energy storage devices, such as batteries and supercapacitors. Embodiments of the invention can effectively address the materials challenges of sulfur-based cathode materials that otherwise can lead to rapid capacity fading in lithium-sulfur batteries. In some embodiments, the materials design and synthesis of sulfur-based cathode materials can realize superior performance for high capacity sulfur-based cathodes. Lithium-sulfur batteries incorporating such cathodes can show high specific discharge capacities and high capacity retention over long cycling. Together with the high abundance of sulfur, manufacturing of sulfur-based cathode materials can be carried out in a highly scalable and low-cost manner.

Some embodiments relate to an encapsulating structure for a sulfur-based electrode having at least one or any combination or sub-combination of the following characteristics: 1) a largely or substantially closed structure for efficient containment of a sulfur-based material (e.g., one or more of elemental sulfur, a metal sulfide, and a metal polysulfide); 2) a reduced surface area for sulfur-electrolyte contact; 3) sufficient empty space to accommodate sulfur volumetric expansion to avoid or reduce pulverization of a sulfur-based active material; 4) a short transport pathway for either, or both, electrons and Li ions to achieve high capacity at a high power rate; 5) a large conductive surface area in contact with a sulfur-based material; and 6) a set of suitable electrolyte additives to passivate a lithium surface to minimize or reduce the shuttle effect.

Some embodiments implement a cathode structure with a sulfur-based material contained or disposed within largely or substantially continuous, hollow encapsulating structures to mitigate against dissolution of the sulfur-based material. The sulfur-based material can include one or more of elemental sulfur, a metal sulfide, a metal polysulfide, or a mixture thereof. For example, the sulfur-based material can include one or more of elemental sulfur, $Li_2S$, $Li_2S_2$, $Li_2S_3$, $Li_2S_x$ with $4 \leq x \leq 8$, or a mixture thereof. The relatively thin walls of the encapsulating structures can enhance the electrical conductivity of the cathode while allowing for the transfer of Li ions through the walls, thereby also affording enhanced ionic conductivity. In conjunction, the walls of the encapsulating structures can serve as effective barriers against polysulfide leakage and dissolution, which barriers are disposed between at least a portion of the sulfur-based material and an electrolyte. In such manner, the walls of the encapsulating structures can form a largely or substantially closed structure for efficient containment of the sulfur-based material, thereby spatially separating or segregating the sulfur-based material as one or more active material domains in an interior of the encapsulating structures and apart from an electrolyte in an exterior of the encapsulating structures. In some embodiments, the presence of barriers and the separation of a sulfur-based material from an electrolyte by the barriers can be demonstrated using, for example, microscope images as explained in the Examples further below. In addition, the presence of voids or empty spaces inside the encapsulating structures allows for sulfur expansion during electrochemical cycling.

Referring to an embodiment of FIG. 1a, a hollow carbon nanofiber-encapsulated sulfur cathode 100 is provided, including a substantially vertical array of hollow carbon nanofibers 102 partially filled with a sulfur-based active material 104 (FIG. 1a). The array of hollow carbon nanofibers 102 can be an ordered or disordered array. AAO membranes are used as templates for the fabrication of hollow carbon nanofibers 102, through a polystyrene carbonization process. The AAO membranes serve both as a template for carbon nanofiber formation and a barrier to inhibit the sulfur-based material 104 from coating onto the exterior carbon fiber walls. In such manner, the sulfur-based material 104 is selectively coated onto the inner surfaces of the hollow nanofibers 102, with any gaps or spaces between the nanofibers 102 substantially devoid of the sulfur-based material 104. By way of example, the nanofiber diameters (e.g., outer diameter) can range from about 200 nm to about 300 nm, while the length is up to about 60 μm or more, corresponding to the AAO template structure. The sulfur-based material 104 is effectively contained in the high aspect ratio carbon nanofibers 102, and its contact with an electrolyte is limited to the two openings at the ends of the nanofibers 102. It is also contemplated that the ends of the nanofibers 102 can be capped to further reduce contact with the electrolyte, such as by depositing or otherwise applying a suitable material to the ends of the nanofibers 102. The hollow structure provides a large space for sulfur expansion during cycling. As lithium can readily penetrate the thin carbon wall, rapid ionic transport is also possible. The one-dimensional nature of conductive carbon allows facile transport of electrons and a large area for contact with the sulfur-based material 104. It is also contemplated that the inner surfaces of the carbon nanofibers 102 can be chemically modified to facilitate coating of the sulfur-based material 104. These attributes of the hollow carbon nanofiber structure allow high specific capacity and stable cycle life of the sulfur-based cathode 100 in lithium-sulfur batteries.

More generally for some embodiments, carbon nanofibers (or other types of hollow, elongated encapsulating structures) can have an outer lateral dimension (e.g., an outer diameter, an outer lateral dimension along a major axis, an averaged outer lateral dimension along a major axis and a minor axis, or another characteristic outer lateral dimension) in the range of about 10 nm to about 5 μm, such as about 20 nm to about 5 μm, from about 30 nm to about 2 μm, about 30 nm to about 1 μm, about 30 nm to about 900 nm, about 50 nm to about 800 nm, about 50 nm to about 700 nm, about 50 nm to about 600 nm, about 50 nm to about 500 nm, about 100 nm to about 500 nm, about 50 nm to about 400 nm, about 100 nm to about 400 nm, or about 200 nm to about 300 nm, a longitudinal dimension (e.g., a length or another characteristic longitudinal dimension) in the range of about 500 nm to about 500 μm, such as about 800 nm to about 400 μm, about 1 μm to about 300 μm, about 1 μm to about 200 μm, about 1 μm to about 150 μm, about 1 μm to about 100 μm, or about 10 μm to about 100 μm, and an aspect ratio (e.g., specified as a ratio of its longitudinal dimension and its outer lateral dimension) that is greater than about 1, such as at least or greater than about 5, at least or greater than about 10, at least or greater than about 20, at least or greater than about 50, at least or greater than about 100, at least or greater than about 300, from about 2 to about 2,000, about 5 to about 1,000, about 10 to about 900, about 10 to about 800, about 50 to about 700, about 50 to about 600, about 50 to about 500, about 100 to about 500, about 100 to about 400, or about 200 to about 400. Also, the carbon nanofibers (or other types of hollow, elongated encapsulating structures) can have an inner lateral dimension (e.g., an inner diameter, an inner lateral dimension along a major axis, an averaged inner lateral dimension along a major axis and a minor axis, or another characteristic inner lateral dimension defining an internal volume to accommodate a sulfur-based material) that is at least about 10 nm, such as at least about 15 nm, at least about 20 nm, at least about 30 nm, at least about 40 nm, at least about 50 nm, at least about 100 nm, at least about 150 nm, or at least about 200 nm, and up to an outer lateral dimension while accounting for a thickness of the walls of the carbon nanofibers. The walls of the carbon nanofibers (or other types of hollow, elongated encapsulating structures) can be in the range of about 0.5 nm to about 100 nm, such as about 1 nm to about 90 nm, about 1 nm to about 80 nm, about 1 nm to about 70 nm, about 1 nm to about 60 nm, about 1 nm to about 50 nm, about 1 nm to about 40 nm, about 1 nm to about 30 nm, about 5 nm to about 30 nm, about 10 nm to about 30 nm, about 1 nm to about 20 nm, about 5 nm to about 20 nm, about 10 nm to about 20 nm, about 1 nm to about 10 nm, or about 5 nm to about 20 nm. The above specified values for dimensions, thicknesses, and aspect ratios can apply to an individual carbon nanofiber (or another type of hollow, elongated encapsulating structure), or can represent an average or a median value across a population of carbon nanofibers.

Diameters of carbon nanofibers (or other types of hollow, elongated encapsulating structures) can be substantially constant or can vary along the lengths of the nanofibers, such as in accordance with a pore morphology of an AAO template structure. Hollow, elongated structures can be formed of other types of conductive materials in place of, or in combination with carbon, such as titanium oxide (doped or undoped) and other types of metal oxides. Examples of other hollow, elongated structures include hollow, metal nanofibers; hollow, metal oxide nanofibers; hollow, metal nitride nanofibers; hollow, metal sulfide nanofibers; and hollow, composite nanofibers. Hollow, elongated structures can be single-shelled or multi-shelled, with different shells formed of the same material or different materials, and surfaces of the hollow, elongated structures can be smooth or rough. Hollow, elongated structures can be electrically conductive, ionically conductive (e.g., with respect to one or more of Li ions, Na ions, K ions, Mg ions, Al ions, Fe ions, and Zn ions), or both.

Advantageously, a sulfur-based material is selectively coated in a well-controlled and reproducible manner onto the inner surfaces of hollow carbon nanofibers, instead of their exterior surfaces, and instead of incorporation within walls of the carbon nanofibers. In such manner, the sulfur-based material can form one or more active material domains that are spaced apart from an electrolyte by the walls of the carbon nanofibers, and exposure of the sulfur-based material to an electrolyte can be reduced, thereby addressing the dissolution issue. To tackle this issue, a template-assisted method is used to fabricate a cathode structure with sulfur selectively coated on the inner wall of the carbon fibers, as shown in FIG. 1b. AAO template (e.g., Whatman, pore size of about 200 nm, thickness of about 60 µm) is used as the template for making hollow carbon nanofibers. Typically, about 120 mg of AAO membrane is placed inside an alumina boat, and about 2 ml of about 10 wt % polystyrene ("PS") (or another suitable carbon-containing polymer) suspended in dimethylformamide ("DMF") (or another suitable solvent) is dropped onto the template as the carbon precursor. The carbonization is performed by heating the AAO/PS/DMF mixture at about 750° C. (or another suitable temperature, such as in the range of about 500° C. to about 1,000° C.) for about four hours (or another suitable time period, such as in the range of about 1 hour to about 10 hours) under a slow flow of $N_2$ gas. After cooling down, the carbon-coated AAO template is loaded into a small glass vial, together with a controlled amount of about 1% sulfur solution in toluene (or another suitable solvent). The sample is dried in a vacuum oven, before being heated up to about 155° C. (or another suitable temperature, such as in the range of about 100° C. to about 200° C.) and kept for about 12 hours (or another suitable time period, such as in the range of about 5 hours to about 20 hours) to ensure uniform sulfur diffusion into the carbon fibers. In this fabrication process, the AAO membrane not only provides a template for hollow carbon nanofiber formation, but also prevents or mitigates against sulfur from coating onto the external surface of the fiber wall. To remove the AAO template, the AAO/carbon nanofiber/S composite is immersed in about 2 M $H_3PO_4$ solution (or another suitable acidic solution) for about 10 hours (or another suitable time period, such as in the range of about 5 hours to about 20 hours). FIG. 1c shows digital camera images of a pristine AAO template before (lighter shade) and after (darker shade) carbon coating and sulfur infusion, indicating that sulfur was absorbed into the hollow carbon fibers. Other types of porous template structures can be used in place of, or in combination with, the AAO template structure.

Figure 2:
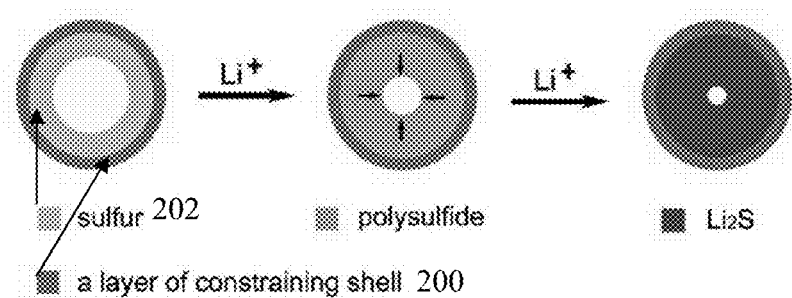
FIG. 2. Schematic of sulfur nanoparticle with empty space and inside an outer shell, illustrating inward expansion during lithiation to accommodate volume expansion and confinement of polysulfides by the shell.

Referring to another embodiment of FIG. 2, encapsulating structures 200 are in the form of outer shells having a spherical or spheroidal shape. The encapsulating structures 200 can have an outer lateral dimension (e.g., an outer diameter, an outer lateral dimension along a major axis, an averaged outer lateral dimension along a major axis and a minor axis, or another characteristic outer lateral dimension) in the range of about 10 nm to about 10 µm, such as about 10 nm to about 5 µm, about 50 nm to about 2 µm, about 100 nm to about 1 µm, about 100 nm to about 900 nm, about 200 nm to about 800 nm, about 300 nm to about 700 nm, about 300 nm to about 600 nm, or about 400 nm to about 500 nm, and an aspect ratio (e.g., specified as a ratio of outer lateral dimensions along a major axis and a minor axis) that is less than about 5, such as no greater than about 4.5, no greater than about 4, no greater than about 3.5, no greater than about 3, no greater than about 2.5, no greater than about 2, no greater than about 1.5, or about 1. In some embodiments, the hollow, spheroidal encapsulating structures are largely or substantially monodisperse, such that at least about 50%, at least about 60%, at least about 70%, at least about 80%, at least about 90%, or at least about 95% of the hollow, spheroidal encapsulating structures are within one or more of the ranges of dimensions specified above. Also, the hollow, spheroidal encapsulating structures can have an inner lateral dimension (e.g., an inner diameter, an inner lateral dimension along a major axis, an averaged inner lateral dimension along a major axis and a minor axis, or another characteristic inner lateral dimension defining an internal volume to accommodate a sulfur-based material) that is at least about 10 nm, such as at least about 15 nm, at least about 20 nm, at least about 30 nm, at least about 40 nm, at least about 50 nm, at least about 100 nm, at least about 150 nm, at least about 200 nm, at least about 250 nm, at least about 300 nm, at least about 350 nm, or at least about 400 nm, and up to an outer lateral dimension while accounting for a thickness of the walls of the encapsulating structures. The walls of the encapsulating structures can have a thickness in the range of about 1 nm to about 100 nm, such as about 5 nm to about 90 nm, about 10 nm to about 80 nm, about 10 nm to about 70 nm, about 10 nm to about 60 nm, about 10 nm to about 50 nm, about 10 nm to about 40 nm, or about 10 nm to about 30 nm. As shown in FIG. 2, the hollow, spheroidal encapsulating structures are formed of a polymer, such as poly(vinyl pyrrolidone) or another conductive polymer having polar groups, non-polar groups, or both (e.g., an amphiphilic polymer). Hollow, spheroidal encapsulating structures can be formed of other types of conductive materials in place of, or in combination with, a polymer, such as carbon, metals, titanium oxide (doped or undoped), and other types of metal oxides, metal nitrides, and metal sulfides. Examples of other hollow, spheroidal structures include hollow, metal shells; hollow, metal oxide shells; hollow, metal nitride shells; hollow, metal sulfide shells; and hollow, composite shells. Hollow, spheroidal encapsulating structures can be electrically conductive, ionically conductive (e.g., with respect to Li ions or other types of ions), or both.

Figure 3A:
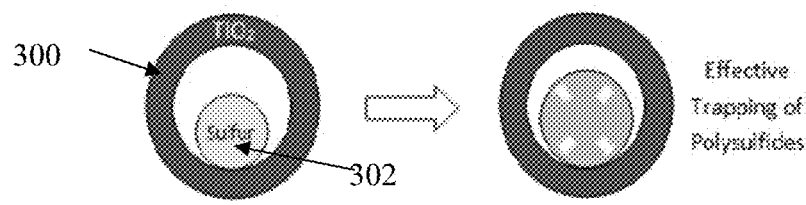
FIG. 3A. Schematic of yolk-shell morphology to provide internal void space to accommodate volume expansion of sulfur during lithiation, resulting in structural intact shell for effective trapping of polysulfides.
Figure 3B:
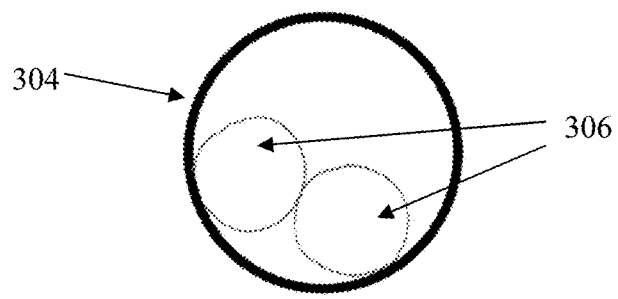
FIG. 3B. Schematic of multi-yolk-shell morphology.

As shown in FIG. 2, a sulfur-based material 202 is disposed within the encapsulating structures 200, with a void or an empty space disposed within an interior of each encapsulating structure 200. In the illustrated embodiment, the sulfur-based material 202 is provided as inner shells or as hollow nanoparticles, with a void or an empty space disposed within an interior of each hollow nanoparticle. In other embodiments, a sulfur-based material 302 or 306 can be disposed within each encapsulating structure 300 or 304 as one or more substantially solid nanoparticles or other types of substantially solid nanostructures (FIGS. 3A and 3B). The embodiment of FIG. 3A can be referred to as having a yolk-shell morphology, with the sulfur-based material 302 corresponding to a "yolk" surrounded by an outer "shell" of the encapsulating structure 300, and the embodiment of FIG. 3B can be referred to as having a multi-yolk-shell morphology, with the sulfur-based material 306 corresponding to multiple "yolks" surrounded by an outer "shell" of the encapsulating structure 304. Although two nanoparticles of the sulfur-based material 306 are shown in FIG. 3B, more or fewer nanoparticles of the sulfur-based material 306 can be included in the encapsulating structure 304, and the number of nanoparticles can be substantially uniform or can vary across a population of the encapsulating structures 304.

More generally, sulfur-based nanoparticles (or other types of nanostructures formed of a sulfur-based material) can have an outer lateral dimension (e.g., an outer diameter, an outer lateral dimension along a major axis, an averaged outer lateral dimension along a major axis and a minor axis, or another characteristic outer lateral dimension) that is at least about 1 nm, such as at least about 5 nm, at least about 10 nm, at least about 15 nm, at least about 20 nm, at least about 30 nm, at least about 40 nm, at least about 50 nm, at least about 100 nm, at least about 150 nm, at least about 200 nm, at least about 250 nm, at least about 300 nm, at least about 350 nm, or at least about 400 nm, and up to an inner lateral dimension of encapsulating structures, while leaving sufficient room for volume expansion during cycling. A sulfur-based nanoparticle can be largely or substantially solid, or can have a void or an empty space disposed within an interior of, and at least partially surrounded by, the sulfur-based nanoparticle. In some embodiments, sulfur-based nanoparticles have a spherical or spheroidal shape. Typically, a sulfur-based nanoparticle has an aspect ratio that is less than about 5, such as no greater than about 4.5, no greater than about 4, no greater than about 3.5, no greater than about 3, no greater than about 2.5, no greater than about 2, no greater than about 1.5, or about 1. Other types of sulfur-based nanostructures can be used in place of, or in combination with, sulfur-based nanoparticles, such as elongated nanostructures having an aspect ratio that is at least about 5, whether solid or hollow.

Referring, for example, to the embodiments of FIGS. 1 through 3B, an exterior of encapsulating structures can be largely or substantially devoid of a sulfur-based material. Also, the walls of the encapsulating structures can be largely or substantially devoid of the sulfur-based material. Stated in another way, the sulfur-based material can be selectively positioned in a well-controlled and reproducible manner within an interior of the encapsulating structures, instead of their exterior surfaces, and instead of infiltration or impregnation of the sulfur-based material within walls of the encapsulating structures. In some embodiments, at a portion of a sulfur-based material is spatially separated or segregated as one or more active material domains in an interior of each encapsulating structure and apart from an electrolyte in an exterior of the encapsulating structure, such as at least about 10% (by weight or volume), at least about 20% (by weight or volume), at least about 30% (by weight or volume), at least about 40% (by weight or volume), at least about 50% (by weight or volume), at least about 60% (by weight or volume), at least about 70% (by weight or volume), at least about 75% (by weight or volume), at least about 80% (by weight or volume), at least about 85% (by weight or volume), at least about 90% (by weight or volume), at least about 95% (by weight or volume), or at least about 98% (by weight or volume), and up to about 99% (by weight or volume), or up to about 99.9% (by weight or volume), up to about 99.99% (by weight or volume), or more, relative to any remaining portion of the sulfur-based material on an exterior and within a wall of the encapsulating structure.

Still referring, for example, to the embodiments of FIGS. 1 through 3B, each encapsulating structure defines an internal volume, and a sulfur-based material is disposed within the internal volume and occupies less than 100% of the internal volume, thereby leaving a void or an empty space inside the encapsulating structure to allow for expansion of the sulfur-based material. In some embodiments, such as for the case of the sulfur-based material is its substantially de-lithiated state, a ratio of the volume of the void inside the encapsulating structure relative to the volume of the sulfur-based material inside the encapsulating structure is in the range of about 1/20 to about 20/1, such as from about 1/10 to about 10/1, from about 1/10 to about 5/1, from about 1/10 to about 3/1, from about 1/10 to about 2/1, from about 1/10 to about 1/1, from about 1/5 to about 3/1, from about 1/5 to about 2/1, from about 1/5 to about 1/1, from about 1/3 to about 3/1, from about 1/3 to about 2/1, from about 1/3 to about 1/1, from about 1/2 to about 3/1, from about 1/2 to about 2/1, from about 1/2 to about 1/1, from about 2/3 to about 3/1, from about 2/3 to about 2/1, or from about 2/3 to about 1/1. In some embodiments, such as for the case of the sulfur-based material is its substantially de-lithiated state, the volume of the void can be at least about 1/20 of the total internal volume inside the encapsulating structure, such as at least about 1/10, at least about 1/5, at least about 1/3, at least about 1/2, or at least about 2/3, with a remainder of the internal volume inside the encapsulating structure taken up by the sulfur-based material. The loading of the sulfur-based material within the encapsulating structures can be controlled so that there is enough empty space for sulfur to expand during lithiation. In some embodiments, a weight ratio of the sulfur-based material relative to a combined mass of the sulfur-based material and the encapsulating structures is in the range of about 1% to about 99%, such as from about 5% to about 95%, from about 10% to about 90%, from about 20% to about 90%, from about 30% to about 80%, from about 40% to about 80%, from about 50% to about 80%, or from about 60% to about 80%.

Electrochemical Energy Storages Including Encapsulated Sulfur Cathodes

Figure 4:
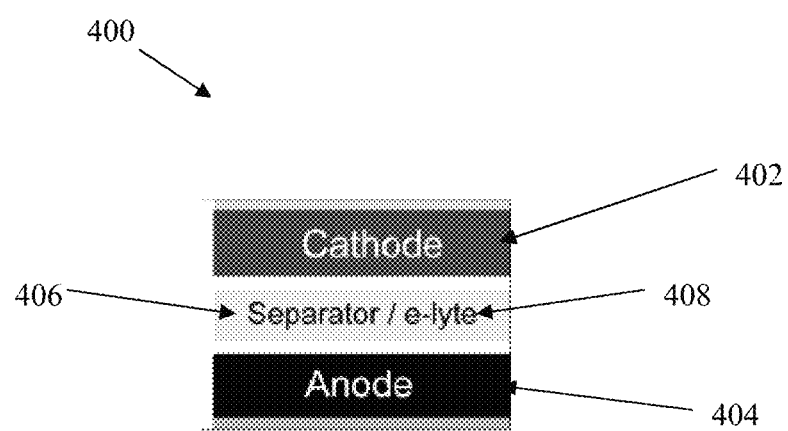
FIG. 4. Schematic of a battery including an encapsulated sulfur cathode.

The electrodes described herein can be used for a variety of batteries and other electrochemical energy storage devices. For example, the electrodes can be substituted in place of, or used in conjunction with, conventional electrodes for lithium-sulfur batteries or other types of batteries. As shown in an embodiment of FIG. 4, a resulting battery 400 can include a cathode 402, an anode 404, and a separator 406 that is disposed between the cathode 402 and the anode 404. The battery 400 also can include an electrolyte 408, which is disposed between the cathode 402 and the anode 404. The cathode 402 can be an encapsulated sulfur cathode as described herein, and the anode 404 can be a lithium-based anode, a silicon-based anode, a germanium-based anode, or another suitable anode.

Resulting batteries, such as the battery 400, can exhibit a maximum discharge capacity at a current rate of C/10 (or at C/5, C/2, 1 C, or another higher or lower reference rate and as evaluated relative to Li/Li$^+$ or another counter/reference electrode) that is at least about 400 mAh/g, such as at least about 500 mAh/g, at least about 600 mAh/g, at least about 700 mAh/g, at least about 800 mAh/g, at least about 900 mAh/g, at least about 1,000 mAh/g, at least about 1,100 mAh/g, at least about 1,200 mAh/g, at least about 1,300 mAh/g, at least about 1,400 mAh/g, or at least about 1,500 mAh/g, and up to about 1,670 mAh/g or more, such as up to about 1,600 mAh/g or up to about 1,560 mAh/g.

Resulting batteries, such as the battery 400, also can exhibit excellent retention of discharge capacity over several cycles, such that, after 100 cycles at a rate of C/10 (or at C/5, C/2, 1 C, or another higher or lower reference rate), at least about 50%, at least about 60%, at least about 70%, at least about 75%, at least about 80%, at least about 85%, or at least about 88%, and up to about 90%, up to about 95%, or more of an initial, maximum, or other reference discharge capacity (e.g., at the 14$^{th}$ cycle) is retained. And, after 200 cycles at a rate of C/10 (or at C/5, C/2, 1 C, or another higher or lower reference rate), at least about 45%, at least about 55%, at least about 65%, at least about 70%, at least about 75%, at least about 83%, at least about 85%, or at least about 87%, and up to about 90%, up to about 95%, or more of an initial, maximum, or other reference discharge capacity (e.g., at the 14$^{th}$ cycle) is retained. And, after 500 cycles at a rate of C/10 (or at C/5, C/2, 1 C, or another higher or lower reference rate), at least about 40%, at least about 50%, at least about 60%, at least about 65%, at least about 70%, at least about 75%, at least about 80%, or at least about 81%, and up to about 90%, up to about 95%, or more of an initial, maximum, or other reference discharge capacity (e.g., at the $14^{th}$ cycle) is retained. And, after 1,000 cycles at a rate of C/10 (or at C/5, C/2, 1 C, or another higher or lower reference rate), at least about 30%, at least about 40%, at least about 50%, at least about 55%, at least about 60%, at least about 63%, at least about 65%, or at least about 67%, and up to about 80%, up to about 85%, or more of an initial, maximum, or other reference discharge capacity (e.g., at the $14^{th}$ cycle) is retained.

Also, in terms of coulombic efficiency (e.g., an initial or a maximum coulombic efficiency or one that is averaged over a certain number of cycles, such as 100, 200, 500, or 1,000 cycles) at a rate of C/10 (or at C/5, C/2, 1 C, or another higher or lower reference rate), resulting batteries, such as the battery 400, can have an efficiency that is at least about 75%, at least about 80%, at least about 85%, at least about 90%, at least about 95%, or at least about 98%, and up to about 99%, up to about 99.5%, up to about 99.9%, or more.

Moreover, in some embodiments, the effectiveness of containment of a sulfur-based material and the structural integrity of encapsulation structures can be assessed in terms of a weight percentage of sulfur (e.g., whether in elemental or another form) present in an electrolyte after a certain number of cycles, relative to a total weight of sulfur (e.g., whether in elemental or another form) as initially included in a cathode. In some embodiments, after 30 cycles at a rate of C/10 (or at C/5, C/2, 1 C, or another higher or lower reference rate), no greater than about 23% of sulfur is present in the electrolyte, such as no greater than about 21% or no greater than about 19%. After 100 cycles at a rate of C/10 (or at C/5, C/2, 1 C, or another higher or lower reference rate), no greater than about 25% of sulfur is present in the electrolyte, such as no greater than about 23% or no greater than about 21%. After 500 cycles at a rate of C/10 (or at C/5, C/2, 1 C, or another higher or lower reference rate), no greater than about 30% of sulfur is present in the electrolyte, such as no greater than about 28% or no greater than about 26%.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1

Hollow Carbon Nanofiber-Encapsulated Sulfur

This example describe the synthesis of hollow carbon nanofiber-encapsulated sulfur electrode structures, including a substantially vertical array of hollow carbon nanofibers filled with melted sulfur. AAO membranes are used as templates for the fabrication of hollow carbon nanofibers, through a polystyrene carbonization process.

Figure 5:
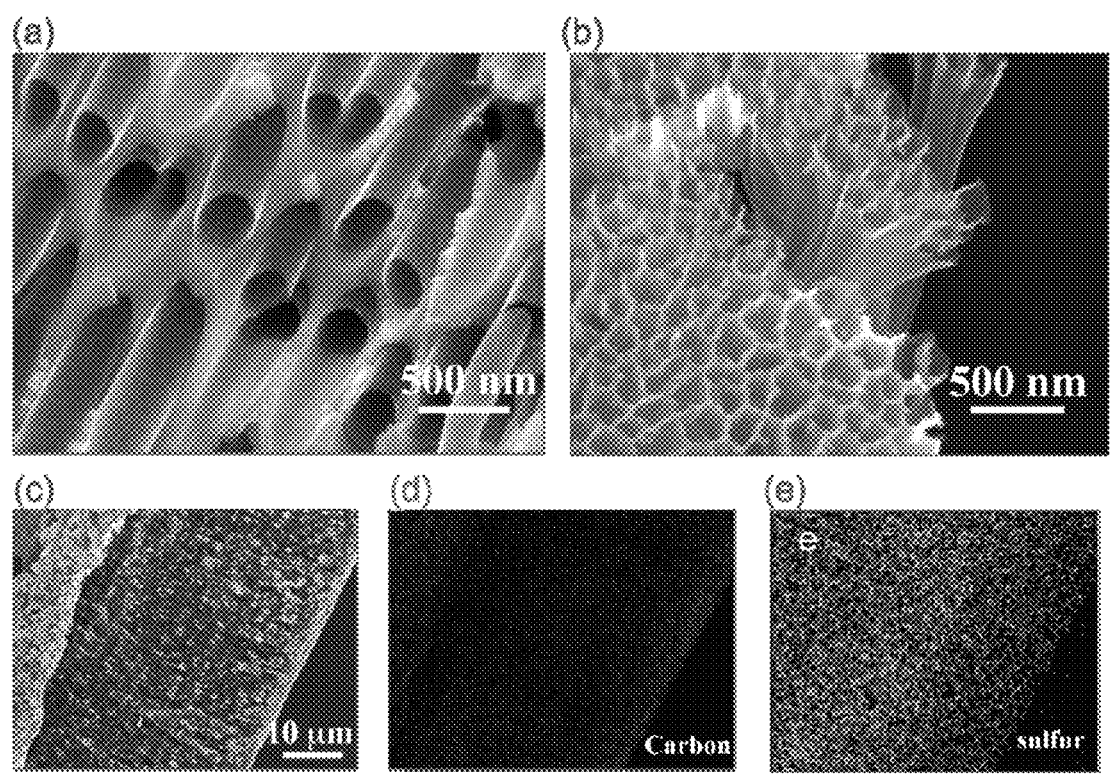
FIG. 5. Scanning electron microscopy ("SEM") characterizations of hollow carbon nanofiber-encapsulated sulfur. (a) AAO template after carbon coating. (b) Carbon nanofiber-encapsulated sulfur after etching away AAO template. (c) Cross-sectional image of hollow carbon/sulfur nanofiber arrays and elemental mapping of carbon (d) and sulfur (e) of FIG. 5c.
Figure 10:
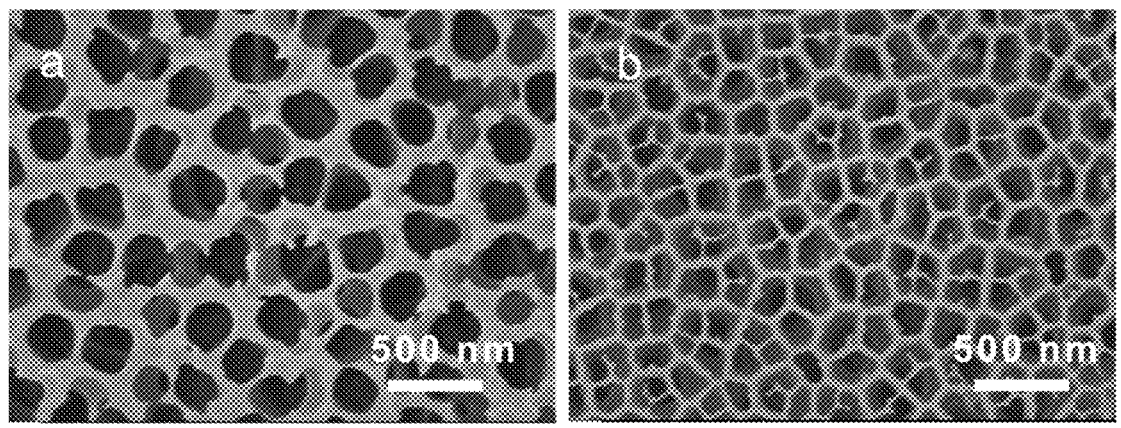
FIG. 10. SEM images of the two sides of AAO template.

Scanning electron microscopy ("SEM") images of designed structures of some embodiments at different stages of fabrication are shown in FIG. 5. After carbon coating at about 750° C., substantially continuous hollow carbon nanofibers are formed inside the AAO template (FIG. 5*a*). The outer diameters of the nanofibers are about 200 nm to about 300 nm, corresponding to the pore size of AAO template (FIG. 10). The weight gain after carbon coating was about 2% of the AAO template. FIG. 5*b* shows the image of hollow carbon nanofibers after sulfur infusion and AAO etching. Typically, the weight ratio of sulfur to carbon was 3:1 in the final electrode structure, corresponding to about 75 vol % of sulfur content in the composite, although other suitable weight ratios are contemplated, such as from about 1:1 to about 10:1 or about 1.5:1 to about 5:1. The sulfur loading is controlled so that there is enough free space (e.g., in the form of gaps or voids within and at least partially extending through the nanofibers after sulfur infusion) for sulfur to expand during the formation of $Li_2S$. To confirm the presence of carbon and sulfur, energy-dispersive X-ray spectroscopy ("EDS") mappings are performed over the cross section of the whole carbon nanofiber array, with the corresponding SEM image in FIG. 5*c*. Carbon (FIG. 5*d*) and sulfur (FIG. 5*e*) signals are detected substantially uniformly over the whole cross section, validating the structural design and indicating that sulfur was well distributed within the hollow carbon nanofibers.

Figure 6:
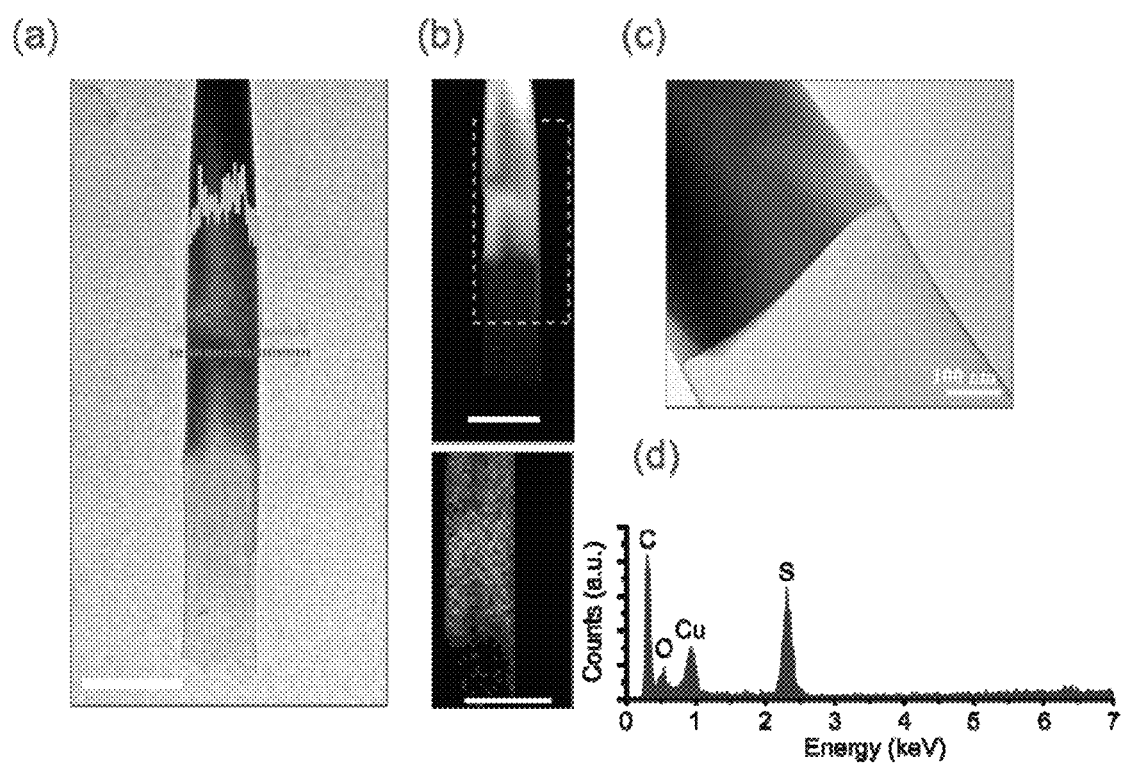
FIG. 6. Transmission electron microscopy ("TEM") characterizations of hollow carbon nanofiber-encapsulated sulfur. (a) Bright field TEM image of an individual nanofiber. The jagged line represents counts of sulfur signal along the dashed horizontal line. (b) Dark field scanning TEM image (up) and energy-dispersive X-ray spectroscopy mapping of sulfur (down) of the nanofiber. (c) Zoom-in image of another sulfur-filled carbon nanofiber, showing the thin carbon wall. (d) The corresponding average energy-dispersive X-ray spectrum obtained from the nanofiber in (c). Scale bars in FIGS. 6a and b are both 500 nm.

Further evidence of sulfur containment within the carbon nanofiber was provided by transmission electron microscopy ("TEM") images of some embodiments. FIG. 6*a* shows a hollow carbon nanofiber with sulfur encapsulated inside. Sulfur appears darker under TEM as it is heavier than carbon. An EDS line-scan (dashed line) across the carbon nanofiber further confirms the presence of sulfur. The spectrum represents the counts of sulfur signal along the dashed line. The spectrum shows that sulfur is present inside the hollow carbon nanofibers, but not outside. This is also verified by the sulfur EDS mapping in FIG. 6*b*. The full EDS spectrum over the whole tube (FIG. 6*d*) shows the carbon and sulfur peaks but not any aluminum signal, indicating that there is little or no alumina residue left from the AAO template. The zoom-in image (FIG. 6*c*) of another carbon nanofiber shows the fiber wall has a small thickness of about 8 nm to about 9 nm, which is desirable in allowing fast kinetics of lithium ion diffusion.

Figure 7:
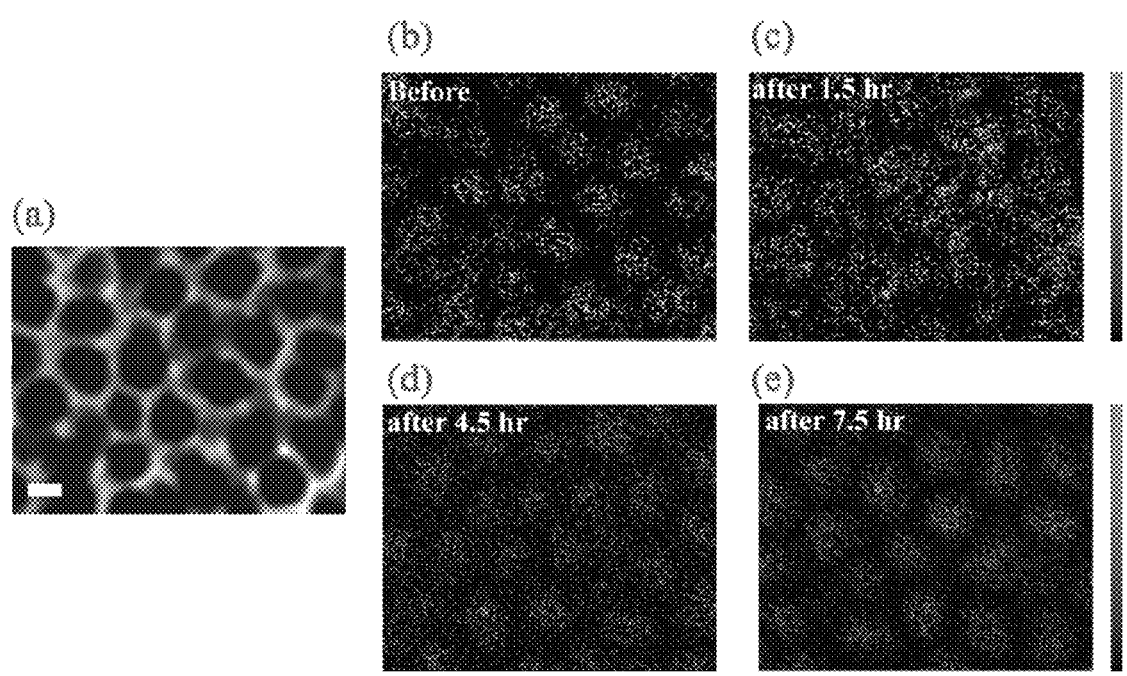
FIG. 7. Auger electron spectroscopy of the AAO/carbon template filled with sulfur, before and after sputtering with Ar ions. (a) SEM image of the top view of carbon coated AAO template after infusion of sulfur. The scale bar is 200 nm. Elemental mapping of sulfur (b) before Ar sputtering, (c) 1.5 hours after Ar sputtering, (d) 4.5 hours after Ar sputtering and (e) 7.5 hours after sputtering. The sputtering rate is about 3.3 μm/hour.

Spatial distribution of sulfur inside the hollow carbon nanofiber arrays is further demonstrated by auger electron spectroscopy ("AES") with Ar ion sputtering, according to some embodiments. FIG. 7*a* shows the top view SEM image of the nanofiber array, revealing the hexagonal packing. The elemental mapping of sulfur before sputtering (FIG. 7*b*) also yields a similar hexagonal pattern, suggesting that sulfur is present in the hollow channels. FIG. 7*c-e* show the sulfur elemental mappings after 1.5 hours, 4.5 hours and 7.5 hours of Ar ion sputtering respectively. Around 25 μm of the sample is etched away after 7.5 hours of sputtering. The variation in the sulfur mapping patterns is due to the change in the AAO channel morphology at different depths (FIG. 10). The hexagonal packing becomes clearer at regions closer to the center of the hollow nanofiber array. The AES mappings show that globally sulfur is well distributed from the top to deep inside the hollow carbon nanofibers. A variety of other regular or irregular patterns are contemplated, such as square patterns, rectangular patterns, triangular patterns, octagonal patterns, and so forth.

The above characterizations show that hollow carbon nanofiber-encapsulated sulfur can be formed with the assist of AAO template. To further understand the crystal structure of carbon and sulfur in the final structure, Raman spectroscopy and X-ray diffraction ("XRD") are performed to study the as-fabricated sulfur electrode of some embodiments. The Raman measurement shows a typical spectrum of partially graphitized carbon, indicated by the G band (about 1600 cm$^{-1}$) and D band (about 1360 cm$^{-1}$) in FIG. 11. G band features the in-plane vibration of sp$^2$ carbon atoms, and D band originates from the defects. The coexistence of the two bands indicates that the carbon was partially graphitized with some amount of defects and disorders. Further optimizations can be implemented to reduce the amount of defects and disorders. The absence of sulfur peak in the Raman spectrum of carbon nanofibers/S composite indicates that sulfur is well encapsulated within the carbon nanofibers.

XRD spectrum (FIG. 12) of the carbon/sulfur composites shows a weak peak at about 23.05°, corresponding to the strongest (222) peak of orthorhombic sulfur (PDF 00-001-0478). This indicates that sulfur in the hollow nanofiber was less crystalline, although further optimizations can be implemented to enhance or otherwise adjust the degree of crystallinity. In some embodiments, there is no peak related to crystalline Al$_2$O$_3$ phase in the XRD pattern, indicating that the AAO template was still amorphous after carbonization at about 750° C. This is desirable for the etching of Al$_2$O$_3$. In contrast, AAO template heated to about 780° C. can be more difficult to remove, and extra peaks appear in the XRD pattern, suggesting that AAO transformed into a crystalline phase (FIG. 13).

To evaluate the electrochemical performance of hollow carbon nanofiber-encapsulated sulfur, 2032-type coin cells are fabricated according to some embodiments. The prepared sample is pressed onto aluminum substrate (or another type of current collector) as the working electrode without any binder or conductive additives. Lithium is used as the counter electrode. The electrolyte is about 1 M lithium bis(trifluoromethanesulfonyl)imide ("LiTFSI") in 1,3-dioxolane and 1,2-dimethoxyethane (volume ratio of about 1:1), although other Li-containing salts and organic solvents can be used. The typical mass loading is about 1.0 mg sulfur/cm$^2$ (although another suitable mass loading is contemplated, such as from about 0.1 mg sulfur/cm$^2$ to about 10 mg sulfur/cm$^2$), and the specific capacities are calculated based on the sulfur mass alone in some embodiments.

Figure 8:
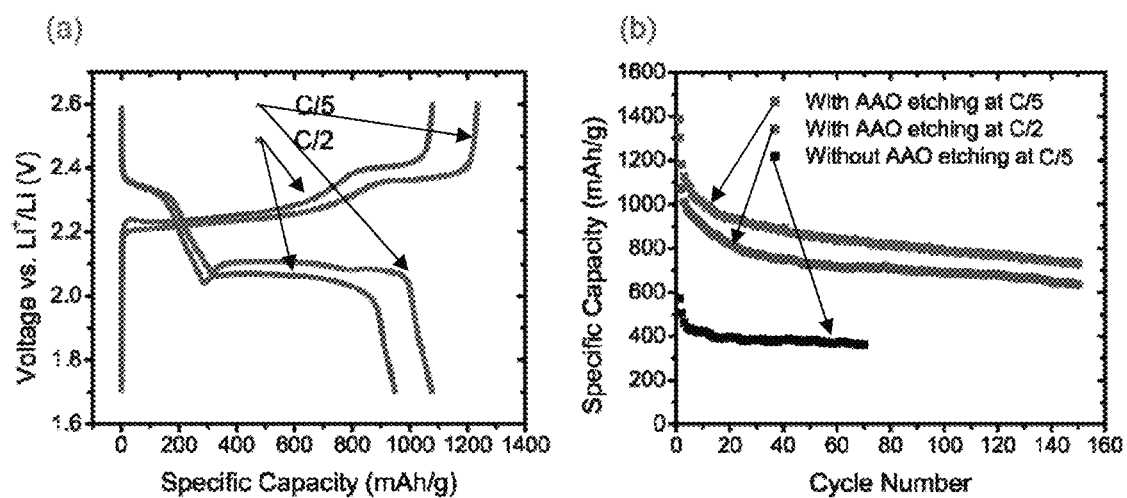
FIG. 8. Electrochemical performance of the carbon nanofiber-encapsulated sulfur cathode. (a) Typical charge/discharge voltage profiles at C/5 and C/2. (b) Cycle life at C/5 and C/2, as compared to a control sample in which the AAO was not etched away. The voltage range is 1.7-2.6 V vs Li/Li$^+$.

The voltage profiles of hollow carbon nanofiber-sulfur composites at different current rates are shown in FIG. 8a according to some embodiments. The discharge/charge profile of both C/5 and C/2 show the typical two-plateau behavior of sulfur-based cathodes, corresponding to the formation of long chain polysulfides (e.g., Li$_2$S$_x$, 4≤x≤8) at about 2.3 V and short chain Li$_2$S$_2$ and Li$_2$S at about 2.1 V. Moreover, the second plateau is substantially flat, suggesting a uniform deposition of Li$_2$S with little kinetic barriers. It is also observed that the cycling capacity drop was small (about 5%) when current rate increases from C/10 to C/5 after four cycles (FIG. 14), indicating good kinetics of the working electrode. This can be attributed to the high quality of carbon and the thin carbon fiber wall, which significantly improved electronic and ionic transport at the cathode.

Cycling performance at C/5 and C/2 is presented in FIG. 8b, together with that of the same carbon hollow fiber/S composite without removing AAO template, according to some embodiments. With AAO etched away, the cathode structure shows impressive capacity retention. At C/5, the reversible capacity is higher than about 900 mAh/g after 30 cycles of charge/discharge. A small decay of about 7% is observed in the next 30 cycles, and the capacity is about 730 mAh/g after 150 cycles. The discharge capacity at C/2 also shows good stability, and the reversible capacity is about 630 mAh/g after 150 cycles. In the control sample in which the AAO template was not etched away, the electrode has a lower stable capacity of about 380 mAh/g. Interestingly, the cycling stability of the non-etched sample is slightly better, as the capacity stabilized after 15 cycles of charge/discharge, and the decay is about 3% for the next 30 cycles before leveling off. This shows that the removal of AAO template can improve charge transfer through the sidewall of the carbon fibers to achieve high cycling capacity, but, at the same time, alumina can potentially help trap polysulfides to improve the cycle life. The mechanical support provided by the AAO template can also enhance the stability of the cathode structure. Further optimizations of the etching time can provide a sulfur electrode with even higher specific capacity and more stable cycle life.

Figure 9:
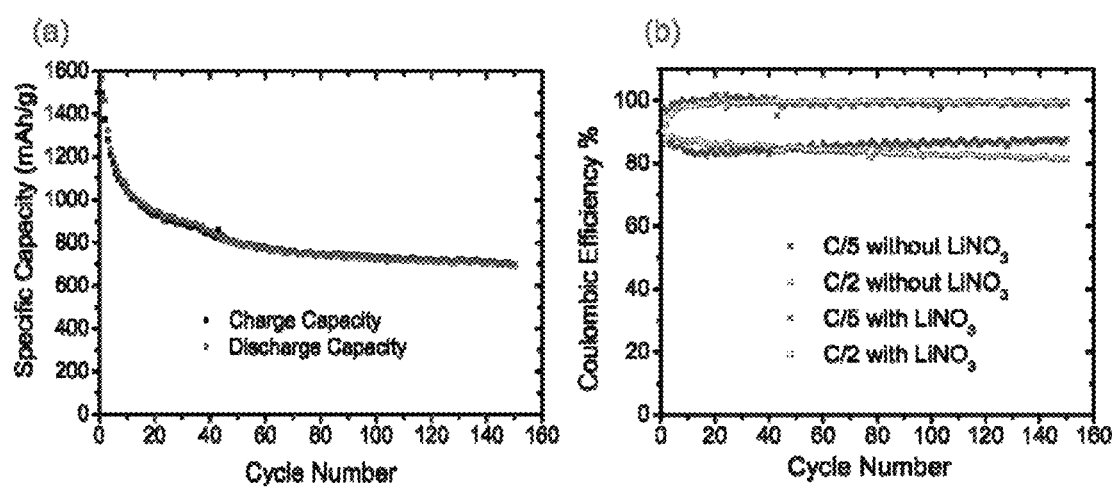
FIG. 9. Electrochemical performance of the carbon nanofiber-encapsulated sulfur electrode in electrolyte with LiNO$_3$ additive. (a) Capacities for charge/discharge cycling at C/5. (b) Comparison of coulombic efficiencies for samples with and without LiNO$_3$ additive in the electrolyte, for cycling at C/5 and C/2.

To further improve the battery performance, about 0.1 mol/L LiNO$_3$ is added to the electrolyte as an additive in some embodiments. LiNO$_3$ can passivate the surface of a lithium anode and thus reduce the shuttle effect. FIG. 9a shows that, in the presence of LiNO$_3$, the initial discharge capacity is about 1,560 mAh/g, approaching the theoretical capacity of sulfur. The cycling stability is similar to the samples without the LiNO$_3$ additive. More importantly, the average coulombic efficiency increases from about 84% to over about 99% at C/5 and from about 86% to about 98% at C/2 (FIG. 9b). The improvement in coulombic efficiency confirms that the LiNO$_3$ additive can significantly reduce polysulfides reaction at the lithium anode and thus the shuttle effect. The combination of rational design of cathode structure and electrolyte additives can achieve high specific capacity sulfur-based cathodes with stable cycling performance and high efficiency.

By way of summary, some embodiments provide a hollow carbon nanofiber-encapsulated sulfur cathode to achieve high performance lithium-sulfur batteries. In this rational design, sulfur is selectively coated onto the inner wall of carbon nanofibers by utilizing an AAO template. The high aspect ratio of hollow carbon nanofibers reduces the random diffusion of polysulfides in the organic electrolyte, while the thin carbon wall allows fast transport of lithium ions. In some embodiments, a stable discharge capacity of about 730 mAh/g is retained after more than 150 cycles of charge/discharge at C/5. Addition of LiNO$_3$ to the electrolyte can further improve the coulombic efficiency to about 98% and about 99% at C/2 and C/5, respectively.

Synthesis of Hollow Carbon Nanofiber-Encapsulated Sulfur:

AAO membrane (Whatman, pore size of about 200 nm, thickness of about 60 μm) was used as the template for making carbon nanofibers. Typically, about 120 mg AAO was placed inside an alumina boat, and about 2 ml polystyrene ("PS") suspended in dimethylformamide ("DMF," about 0.1 g/ml) was dropped onto the template as the carbon precursor. The carbonization was carried out by heating AAO/PS/DMF at about 750° C. for about 4 hours under a slow flow of N$_2$ gas. After cooling down, about 15 mg of carbon-coated AAO template was loaded into a small glass vial, and about 300 μl of about 1% sulfur solution in toluene was dropped onto the template. The amount of sulfur solution was controlled so that the final loading of sulfur in the AAO template was about 1 mg. After drying, the mixture was heated up to about 155° C. and kept for about 12 hours to ensure sufficient sulfur diffusion into the hollow nanofibers. The AAO template helped prevent sulfur coating onto the outer surface of the carbon nanofibers. Sulfur residue sticking on the surface of the template was washed away using methanol. Total sulfur loading in the sample was calculated by weighing the sample before and after sulfur infusion. The AAO template was removed by immersing in a solution of 2 M H₃PO₄ for about 10 hours.

Characterizations:

FEI XL30 Sirion SEM with field emission guns ("FEG") source was used for SEM characterizations. FEI Tecnai G2 F20 X-TWIN Transmission Electron Microscope was used for TEM characterizations. A Renishaw RM1000 Raman microscope at the Extreme Environments Laboratory at Stanford University was used for the Raman spectroscopy.

Electrochemical Measurement:

To evaluate the electrochemical performance of hollow carbon nanofiber/sulfur composite, 2032-type coin cells (MTI Corporation) were fabricated. The prepared samples were pressed onto aluminum substrate as the working electrode without any binder or conductive additives. Lithium foil (Alfa Aesar) was used as the counter electrode. The electrolyte is about 1 M lithium bis(trifluoromethanesulfonyl)imide ("LiTFSI") in 1,3-dioxolane and 1,2-dimethoxyethane (volume ratio of about 1:1). For electrolyte with LiNO₃ additive, LiNO₃ (Sigma Aldrich) was first dried at about 100° C. under vacuum over night, before being added to the electrolyte to reach a concentration of about 0.1 mol/L. The mass loading of sulfur in the working electrode was about 1.0 mg/cm². Batteries testing were performed using a 96-channel battery tester (Arbin Instrument). The voltage range is 1.7-2.6 V vs Li/Li⁺

SEM Characterization of AAO Template:

AAO template has different morphology on the two sides (FIG. 10). The pore sizes are about 200 nm to about 300 nm.

Figure 11:
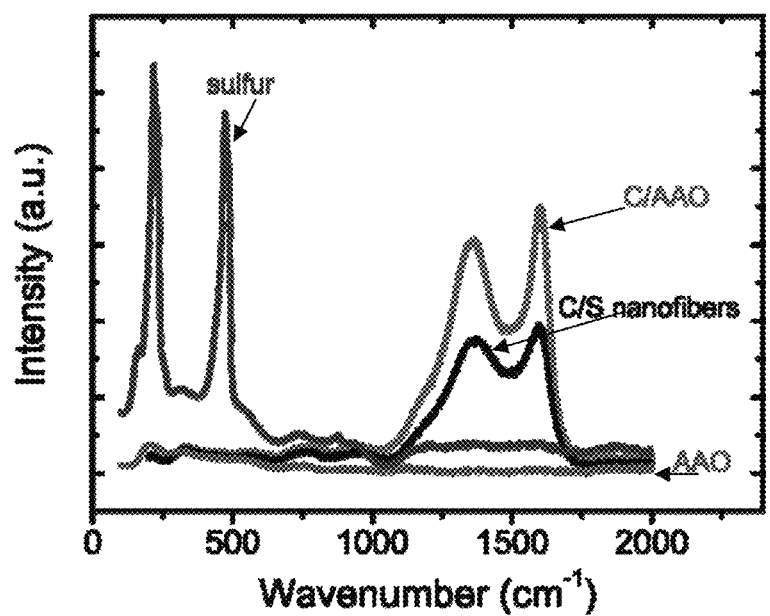
FIG. 11. Raman spectra of four samples: pure sulfur, carbon coated AAO template, hollow carbon nanofiber-encapsulated sulfur, and pure AAO template. No noticeable sulfur signal was detected in the hollow carbon nanofiber-encapsulated sulfur.

Raman Spectroscopy Measurement:

FIG. 11 shows Raman spectra of four samples.

Figure 12:
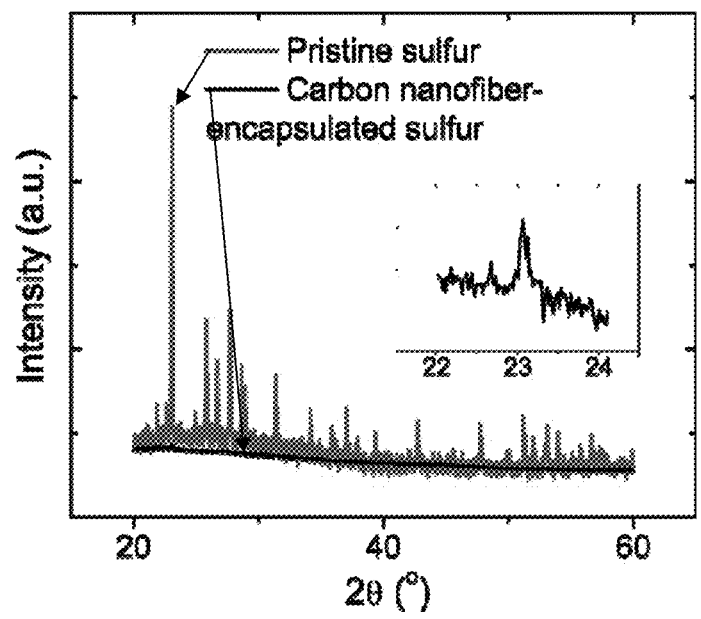
FIG. 12. Comparison of the X-ray diffraction spectra for pristine sulfur and hollow carbon nanofiber-encapsulated sulfur. Inset is the zoom-in image of the encapsulated sulfur between 22° and 24°
Figure 13:
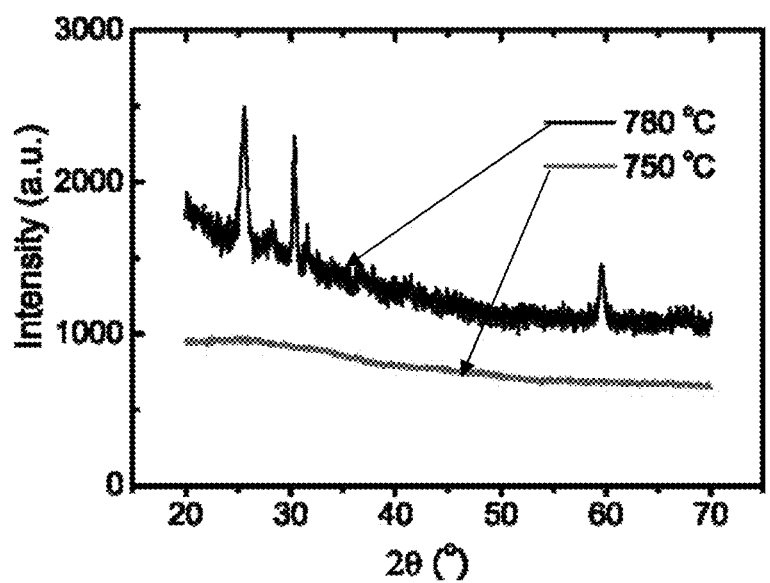
FIG. 13. X-ray diffraction spectra of AAO template after carbon coating at 750° C. and 780° C.

X-Ray Diffraction Characterizations:

FIG. 12 shows a comparison of the XRD spectra for pristine sulfur and hollow carbon nanofiber-encapsulated sulfur. A series of peaks are observed in XRD spectra for AAO template heated to about 780° C., while AAO template heated to about 750° C. shows no diffraction peaks (FIG. 13). This indicates a phase transition of AAO between about 750° C. and about 780° C.

Figure 14:
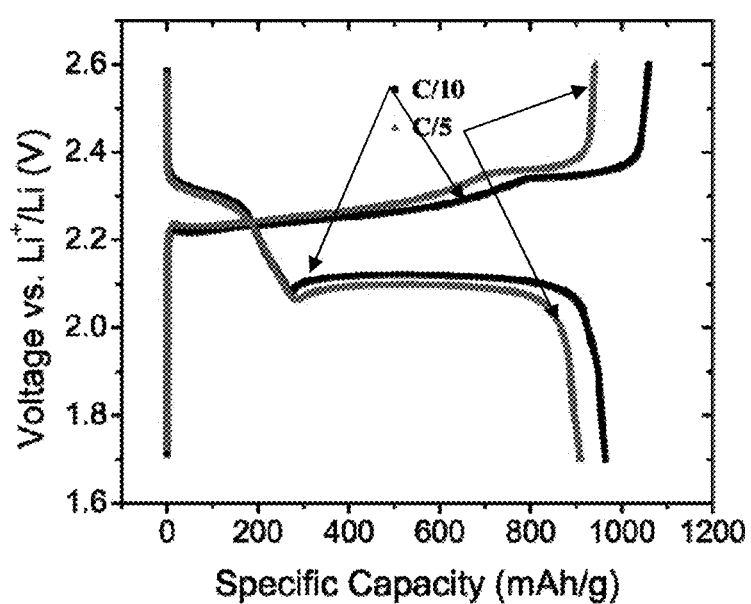
FIG. 14. Charge/discharge voltage profiles of hollow carbon nanofiber-encapsulated sulfur at C/10 and C/5 rates.

Voltage Profiles:

FIG. 14 shows charge/discharge voltage profiles of hollow carbon nanofiber-encapsulated sulfur at C/10 and C/5.

Example 2

Polymer-Encapsulated Hollow Sulfur Nanoparticles

This example describes the implementation of a monodisperse, polymer-encapsulated hollow sulfur nanoparticle cathode through a scalable, one-stage, room-temperature synthesis. The cathode incorporates features to largely or fully address various challenges of sulfur-based materials. The synthesis is based on a reaction between sodium thiosulfate and hydrochloric acid in an aqueous solution in the presence of poly(vinyl pyrrolidone) ("PVP"). The reaction can be represented as the following:

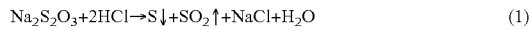

$$Na_2S_2O_3 + 2HCl \rightarrow S\downarrow + SO_2\uparrow + NaCl + H_2O \quad (1)$$

Compared with other possible approaches for sulfur cathode synthesis, the fabrication of sulfur nanoparticles offers one or more of the following advantages. 1) Neither time-consuming procedures nor high temperatures are involved. The synthesis is carried out at about room temperature within about two hours in one stage. 2) The synthesis is low-cost, environmentally benign, and highly reproducible. The synthesis can produce hollow sulfur nanoparticles with high quality on a scale of grams per batch. Such a synthesis also can be readily scaled up for industrial applications. 3) The use of sulfur nanoparticles in battery electrodes is compatible with traditional lithium-ion battery manufacturing techniques by allowing the use of conventional conductive additives, binders, and electrolytes.

Figure 15:
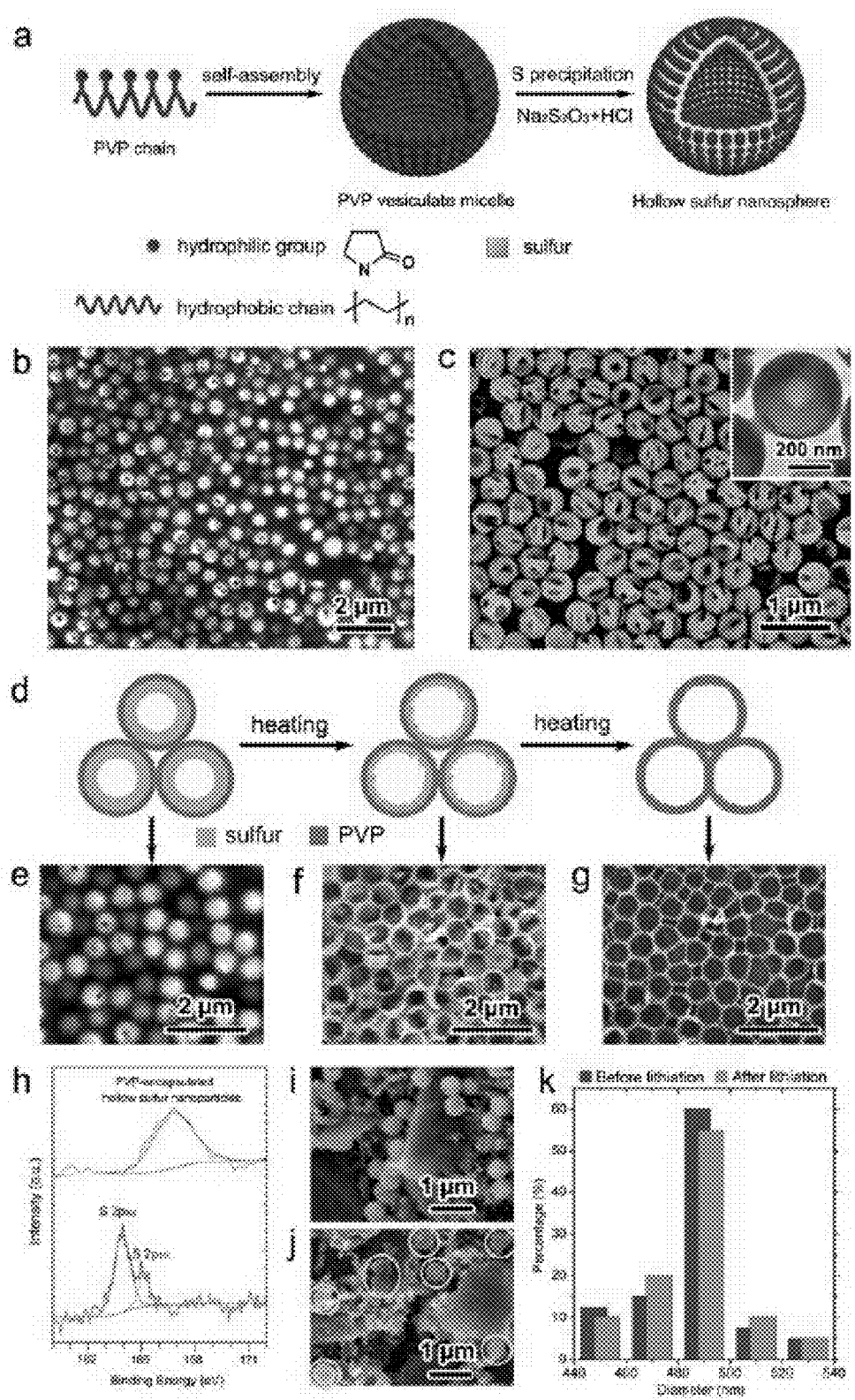
FIG. 15. Fabrication, characterization and lithiation of polymer-encapsulated hollow sulfur nanoparticles. (a) Schematic of the formation mechanism for polymer-encapsulated hollow sulfur nanoparticles. (b) SEM image of the as-prepared polymer-encapsulated hollow sulfur nanoparticles. (c) SEM image of the hollow sulfur nanoparticles after washing them with water to remove the polymer on the particle surface. Inset in (c): TEM image of an individual hollow sulfur nanoparticle. (d) Schematic diagram illustrating the subliming process of the polymer-encapsulated hollow sulfur nanoparticles. (e-g) SEM images of the sulfur nanoparticles (e) before, (f) during, and (g) after sulfur sublimation, respectively. (h) X-ray photoelectron spectroscopy ("XPS") spectra of polymer-encapsulated hollow sulfur nanoparticles (top trace) and pure elemental sulfur (bottom trace). (i, j) Typical SEM images of sulfur nanoparticles on a conducting carbon-fiber paper (i) before and (j) after lithiation. The particles after lithiation were marked with circles in (j). (k) A comparison of the size distribution of sulfur nanoparticles before and after lithiation.

FIG. 15a schematically shows the formation mechanism for polymer-encapsulated hollow sulfur nanoparticles. PVP molecules can form hollow microspheres due to a self-assembly process, and can be used as a soft template for synthesizing hollow spheres of conductive polymers. In aqueous solution, both the polymer backbone and the methylene groups in the five-membered ring of PVP can allow the association of PVP molecules through hydrophobic interaction, while the electronegative amide groups (dots) are effectively linked together through the hydrogen bond network of water. Therefore, it is expected that the PVP molecules can self-assemble into a hollow spherical vesicular micelle with a double-layer structure, having their hydrophobic alkyl backbones pointed toward the interior of the micelle wall and the hydrophilic amide group facing outward (FIG. 15a). The hydrophobic nature of sulfur promotes its preferential growth onto the hydrophobic portion of the PVP micelles, and thus these micelles serve as a soft template to direct the growth of hollow sulfur nanoparticles. PVP can also absorb on a sulfur nanoparticle surface if sulfur is exposed to water during growth, forming a dense layer of polymer coating. That is, sulfur is located in the interior of the hollow PVP wall and is isolated from the water by PVP.

FIGS. 15b-c show SEM images of the PVP-encapsulated hollow sulfur nanoparticles. These SEM images show several features of these nanoparticles. First, the nanoparticles are substantially monodisperse in size. A statistic counting over 200 sulfur nanoparticles in a synthesis batch (FIG. 18) shows that the diameters of about 95% of nanoparticles are in the range of about 400 nm to about 460 nm. Between different batches of synthesis, a similar monodispersity is reproducible with the average diameter shifted slightly within the window of about 400 nm to about 500 nm. Second, the nanoparticles appear to be hollow. This was also confirmed by the distinct contrast shown in the TEM image (inset of FIG. 15c). It is noted that many of the sulfur nanoparticles have small pores in their walls besides the large empty space or void in the middle. This could be due to SO₂ bubbles generated during the nanoparticle synthesis accompanying with sulfur precipitation (Eq. 1). However, despite the pores inside the sulfur wall, sulfur is still largely or substantially isolated from the outside solution by PVP since sulfur is hydrophobic.

To reveal PVP shells on sulfur nanoparticles, a sulfur nanoparticle suspension is drop-casted on a silicon substrate, followed by heating in vacuum and analysis under SEM. FIG. 15d shows a schematic illustrating the sulfur subliming process of the PVP-encapsulated hollow sulfur nanoparticles. FIG. 15e-g show the corresponding SEM images of the sample before, during, and after sulfur sublimation, respectively. After substantially all of the sulfur had been sublimed (as confirmed by Energy-dispersive X-ray analysis showing no detectable sulfur signal), the PVP shells surrounding the nanoparticles can be readily resolved (FIG. 15g). Thermal gravimetric analysis (FIG. 19) reveals that the amount of elemental sulfur in the sample is about 70.4 wt %. From the weight percentage of sulfur, nanoparticle size, and a thickness of a PVP shell, it can be estimated that the void volume inside each nanoparticle is about 56% of the sulfur wall volume. Assuming the volume expansion is linearly dependent on the degree of lithiation, this void volume would allow about 70% of the theoretical capacity or about 1,170 mAh/g to be used if only inward volume expansion is considered. FIG. 15h shows the variations in the XPS spectra of the PVP-encapsulated hollow sulfur nanoparticles and pure elemental sulfur. For pure sulfur, two peaks positioned at about 163.9 eV and about 165.1 eV can be assigned to the S 2p3/2 and S 2p1/2, respectively. As to hollow sulfur nanoparticles, the sulfur peak shifts to a higher binding energy with its core level located at about 167 eV, and exhibits broader full widths at half maximum, indicating partial charge transfer of sulfur to PVP. This result shows the interaction between PVP and sulfur, which can contribute to the effective trapping of polysulfides and thus result in excellent capacity retention.

To evaluate whether there is any volume expansion outwards of the PVP-encapsulated hollow sulfur nanoparticles after lithiation, a sulfur nanoparticle suspension is dropcasted on a piece of conducting carbon-fiber paper (used as substrate), and then dried in vacuum overnight. A pouch cell was assembled in an argon-filled glovebox using the carbon-fiber paper with sulfur nanoparticles as cathode and lithium foil as anode. The pouch cell was discharged at a current rate of about C/5 to about 1.5 V, and then the voltage was held at about 1.5 V for about 18 h. A typical two-plateau voltage profile of the sulfur cathode can be observed (FIG. 20), indicating that lithium ions can penetrate through the PVP shell and react with the interior sulfur during lithiation. After the first lithiation, the carbon-fiber paper cathode from the cell was retrieved and washed with 1,3-dioxolane. Typical SEM images of the PVP-encapsulated hollow sulfur nanoparticles on the carbon-fiber paper substrate before and after lithiation are shown in FIGS. 15i-j, while FIG. 15k presents the size distribution of the sulfur nanoparticles before and after lithiation. It can be observed that the nanoparticles after lithiation still preserved nearly a spherical shape (FIG. 15j, marked by circles), and no noticeable size difference was observed between the nanoparticles before and after lithiation (average diameter: about 483 nm (before) and about 486 nm (after)). This indicates that sulfur expands inwardly into the hollow space, and the polymer shell is mechanically rigid enough to impede outward expansion or breakage. Thus, the polymer shell can effectively impede polysulfides from diffusing into an electrolyte.

The inward expansion of PVP-encapsulated hollow sulfur nanoparticles during lithiation opens up opportunities for high performance sulfur-based battery cathodes. To test electrochemical performance, Type 2032 Coin cells were assembled using a metallic lithium foil as anode. $LiNO_3$ was added to an electrolyte as an additive to passivate the lithium anode surface. The specific capacities were calculated based on sulfur mass alone.

Figure 16:
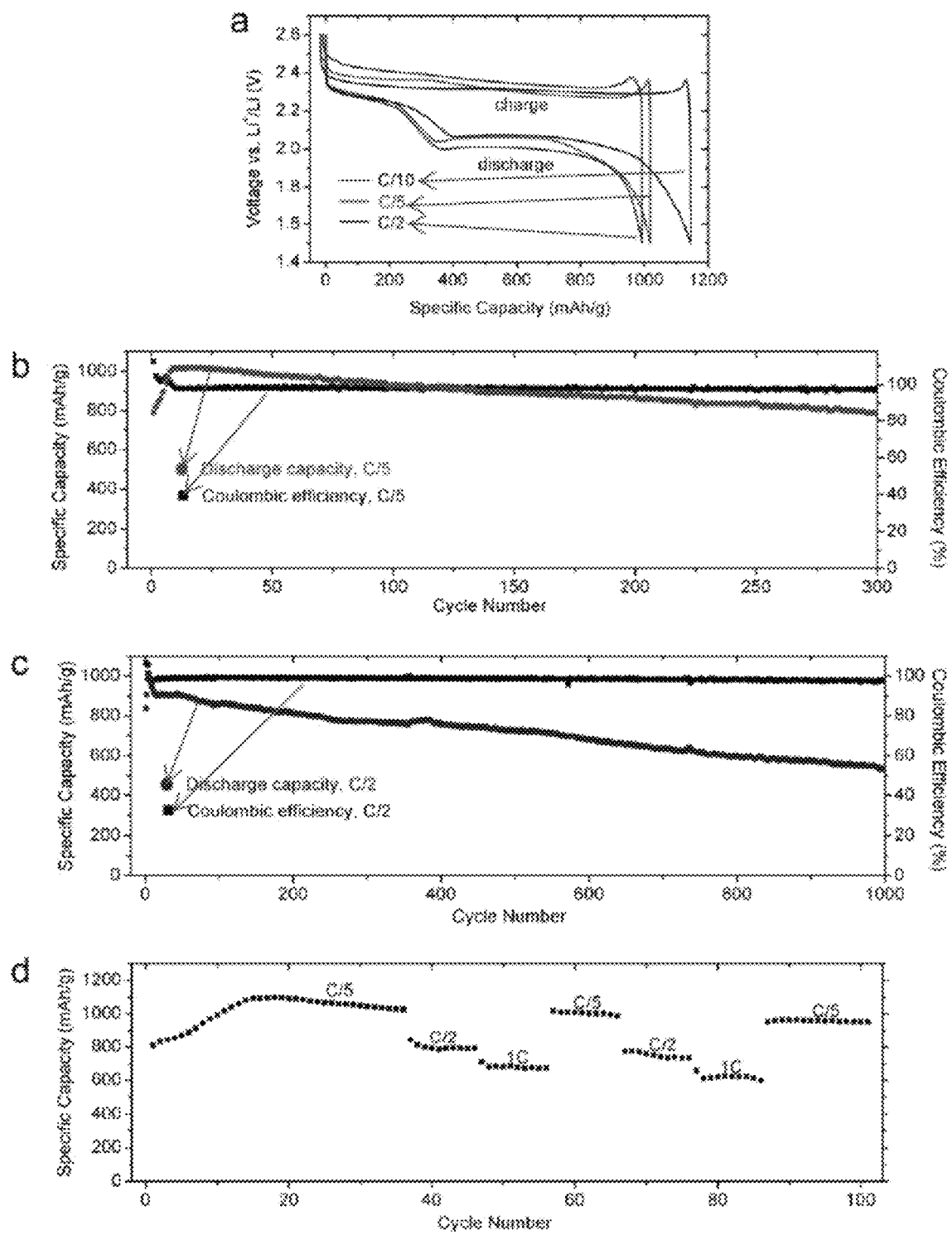
FIG. 16. Electrochemical characteristics of polymer-encapsulated hollow sulfur nanoparticles. (a) Typical discharge-charge voltage profiles of cells made from the polymer-encapsulated hollow sulfur nanoparticles at different current rates (C/10, C/5 and C/2, 1 C=1673 mA/g) in the potential range of 2.6-1.5 V at room temperature. (b) Cycling performance and Coulombic efficiency of the cell at a current rate of C/5 for 300 cycles. (c) Cycling performance and Coulombic efficiency of the cell at a current rate of C/2 for 1,000 cycles. (d) Rate capability of the cell discharged at various current rates.

FIG. 16a shows the typical discharge-charge voltage profiles of the cells made from the PVP-encapsulated, hollow sulfur nanoparticles at different current rates (C/10, C/5 and C/2, where 1 C=1,673 mA/g) in the potential range of 2.6-1.5 V at room temperature. At C/10, a capacity of about 1,179 mAh/g can be obtained, consistent with the estimation of capacity based on the available internal available space inside hollow nanoparticles. At higher discharge rates of C/5 and C/2, the electrode delivered a capacity of about 1,018 mAh/g and about 990 mAh/g, respectively. The discharge profiles of all three current densities were characterized by a two-plateau behavior of a typical sulfur cathode. FIG. 16b shows the cycling performances of the cells made from the PVP-encapsulated hollow sulfur nanoparticles at C/5 rate for 300 cycles. The discharge capacity exhibited a gradual increase during the first several cycles, indicating an activation process for the electrodes. This activation may be due to the polymer coating on the sulfur nanoparticle surface, and may relate to an amount of time for the electrolyte to wet an outer surface of the nanoparticles and become electrochemically active. At C/5 rate, an initial capacity of about 792 mAh/g was measured. After several cycles of activation, the discharge capacity reached its highest, about 1,018 mAh/g. A capacity of about 931 mAh/g was retained after 100 cycles of charge/discharge, showing excellent capacity retention of about 91.5% (of its highest discharge capacity of about 1,018 mAh/g). A reversible capacity of about 790 mAh/g was still retained after 300 cycles, corresponding to a capacity retention of about 77.6% of its highest capacity, and corresponding to a decay of about 7.8% per 100 cycles. The average Coulombic efficiency of the cell at C/5 rate for 300 cycles is about 98.08% (FIG. 16b).

When discharged/charged at C/2 rate (FIG. 16c), the cell also exhibits excellent cycling stability. After reaching its highest capacity, the discharge capacity stabilized at about 905 mAh/g after 10 more cycles (at the $14^{th}$ cycle). A discharge capacity of about 857 mAh/g and about 773 mAh/g can be obtained after 100 and 300 cycles, corresponding to a capacity retention of about 94.7% and about 85.4% of its stabilized capacity at the $14^{th}$ cycle, respectively. After 500 and 1,000 cycles, the cell delivered a reversible discharge capacity of about 727 mAh/g and 535 mAh/g, respectively, corresponding to a capacity retention of about 80.3% and about 59.1% (of its stabilized capacity at the $14^{th}$ cycle). The capacity decay was as low as about 0.04% (about 0.37 mAh/g) per cycle. The cell also maintained a high Coulombic efficiency even after 1,000 cycles (FIG. 16c), and the average over 1,000 cycles is about 98.5%.

Figure 21:
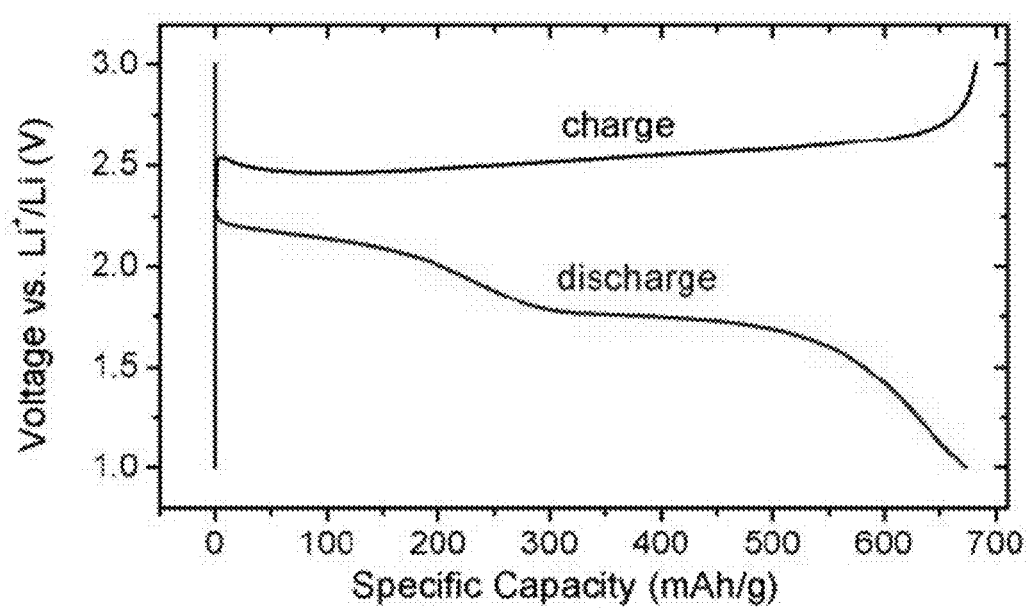
FIG. 21. Typical discharge/charge profiles of a cell made from polymer-encapsulated hollow sulfur nanoparticles at 1 C rate.

The excellent cycling performance of the hollow sulfur nanoparticles was reproducible over many coin cells. Another example of the electrochemical performance of the hollow sulfur nanoparticle electrode is demonstrated in FIG. 16d. The cell reached its highest capacity of about 1,099 mAh/g after 18 cycles at C/5 rate, and showed a stable reversible capacity of about 1,026 mAh/g after 36 cycles. Further cycling at different rates (C/2 and 1 C, each for 10 cycles) showed a reversible capacity of about 800 mAh/g at C/2 rate and about 674 mAh/g at 1 C rate (a typical discharge/charge curve at 1 C rate is shown in FIG. 21). When the cell was discharged at C/5 rate again, a reversible capacity of about 989 mAh/g can be obtained after 10 more cycles, suggesting the high stability of the electrode. Even after another round of cycling at various current rates, a reversible capacity of about 953 mAh/g can still be retained at C/5 rate after 100 cycles, indicating superior capacity reversibility and good rate performance.

Figure 17:
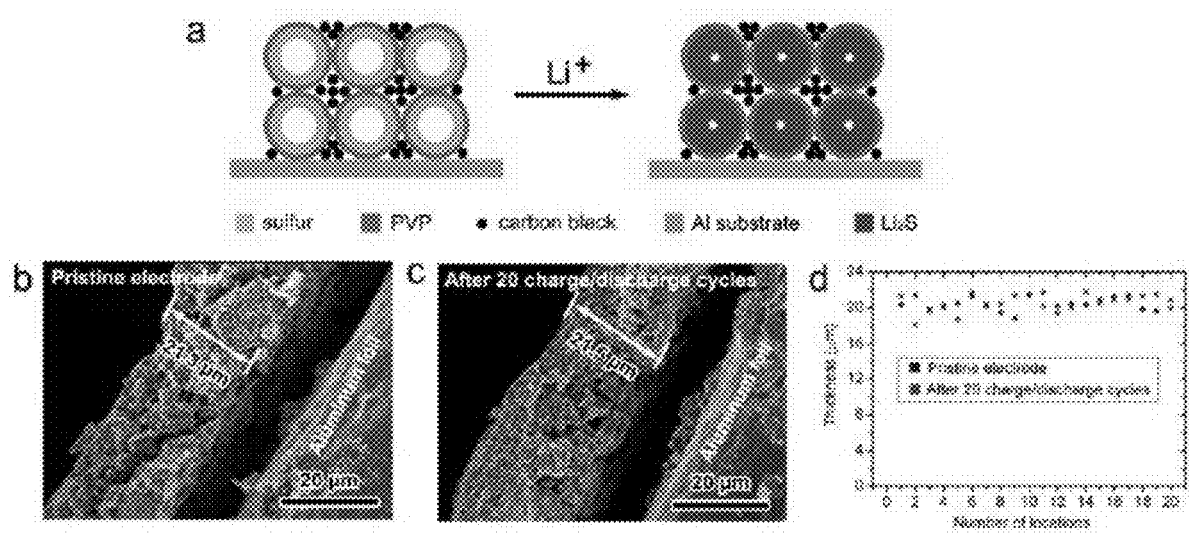
FIG. 17. Electrode thickness evaluation of a hollow sulfur nanoparticle cathode. (a) Schematic illustrating that an electrode thickness undergoes little or no change owing to the inward expansion of each of the hollow sulfur nanoparticles upon lithiation. Typical SEM images of the cross-sections of the hollow sulfur nanoparticle cathode, showing the thickness of (b) the pristine electrode and (c) the electrode after 20 charge/discharge cycles (at fully discharged (lithiated) state). (d) A comparison of the thickness at 20 different locations for the cross-sections of the pristine electrode and the electrode after 20 charge/discharge cycles.

For battery materials with a relatively large volume change, the associated volume change propagating to the macroscopic scale of the whole electrode can be a challenge. This macroscopic expansion problem can be overcome via the PVP-encapsulated hollow sulfur nanoparticles since the volume expansion is mitigated locally at each particle toward an inside hollow space. FIG. 17a presents a schematic showing that the whole electrode thickness undergoes little or no change. FIG. 17b shows typical SEM images of the cross-sections of the cathode before and after 20 charge/discharge cycles (at C/5 rate, fully discharged (lithiated) state). FIG. 17d shows the electrode thickness at 20 different locations for the cross-sections of the pristine electrode and the electrode after cycling, showing no noticeable signs of volume expansion at the whole electrode level. These results are noteworthy for the design of a full battery.

By way of summary, substantially monodisperse, polymer-encapsulated hollow sulfur nanoparticles are synthesized through a cost-effective, one-stage method in aqueous solution at room temperature. This example demonstrates excellent performance of battery electrodes formed of these hollow nanoparticles. As a highlight, battery electrodes exhibit excellent cycle life at or beyond 500 cycles with about 80% or more capacity retention, which is a standard industrial specification for portable electronics.

Methods:

For the synthesis of PVP-encapsulated hollow sulfur nanoparticles, about 50 mL of about 40 mM sodium thiosulfate ($Na_2S_2O_3$, Aldrich) aqueous solution was mixed with about 50 mL of about 0.2 M PVP (MW of about 55,000, Aldrich) at room temperature. Then, about 0.2 mL of concentrated hydrochloric acid (HCl) was added to the $Na_2S_2O_3$/PVP solution under magnetic stirring. After the reaction had proceeded at room temperature for about 2 h, the solution was centrifuged at about 8,000 rpm for about 10 min to isolate the precipitate. In the washing process, the precipitate was washed with about 0.8 M of PVP aqueous solution once and centrifuged at about 6,000 rpm for about 15 min.

For SEM and TEM characterization, SEM images were taken using FEI XL30 Sirion SEM operated at an accelerating voltage of about 5 kV. TEM imaging was performed on a FEI Tecnai G2 F20 X-TWIN TEM operated at about 200 kV.

For electrochemical measurement, the PVP-encapsulated hollow sulfur nanoparticle powder was mixed with Super-P carbon black and polyvinylidene fluoride (PVDF) binder, with mass ratio of about 60:25:15, in N-Methyl-2-pyrrolidone (NMP) solvent to produce an electrode slurry. The slurry was coated onto an aluminum foil current collector using doctor blade and then dried to form the working electrode. The typical mass loading of active sulfur was in the range of about 0.8-1.8 mg/cm$^2$. 2032-type coin cells (MTI Corporation) were fabricated using the working electrode and lithium metal foil as the counter electrode. The electrolyte was about 1.0 M lithium bis(trifluoro methanesulfonyl)imide (LiTFSI) and about 0.1 M $LiNO_3$ in 1,3-dioxolane and 1,2-dimethoxyethane (volume ratio of about 1:1). The coin cells were assembled inside an argon-filled glovebox. Galvanostatic measurements were made using MTI battery analyzers. The specific capacities were all calculated based on the mass of active sulfur.

Calculation of the Void Volume Inside Each Nanoparticle:
Density of sulfur: $\rho_S=2$ g/cm$^3$
Density of PVP: $\rho_{PVP}=1.2$ g/cm$^3$
The thickness of PVP shell on the sulfur particle (based on FIG. 2g): 28.5 nm.
The diameter of the PVP-encapsulated sulfur nanoparticles: D=483 nm.
The outer diameter of the sulfur wall is $d_{out}$=483−28.5×2=426 nm
The volume of PVP shell ($V_{PVP}$) is:

$$V_{PVP} = 4/3 \times \pi \times \left((D/2)^3 - (d_{out}/2)^3\right)$$
$$= 4/3 \times \pi \times \left((483/2)^3 - (426/2)^3\right)$$

The weight of PVP ($m_{PVP}$) is:
$$m_{PVP} = V_{PVP} \times \rho_{PVP}$$

Since the weight of PVP is 30% of the weight of the PVP-encapsulated sulfur particles, So the volume of sulfur (Vs) is $$V_S = m_{PVP}/30\% \times 70\%/\rho_S$$
$$= 2.59 \times 10^7 \text{ nm}^3$$

So the inner diameter of the sulfur wall ($d_{in}$) is:

$$V_S = 4/3 \times \pi \times ((d_{out}/2)^3 - (d_{in}/2)^3)$$

$d_{in}$=303 nm

Thus, the void volume inside each hollow nanoparticle is represented as:

$$(d_{in}/2)^3/((d_{out}/2)^3-(d_{in}/2)^3)=56\% \quad (2)$$

Figure 18:
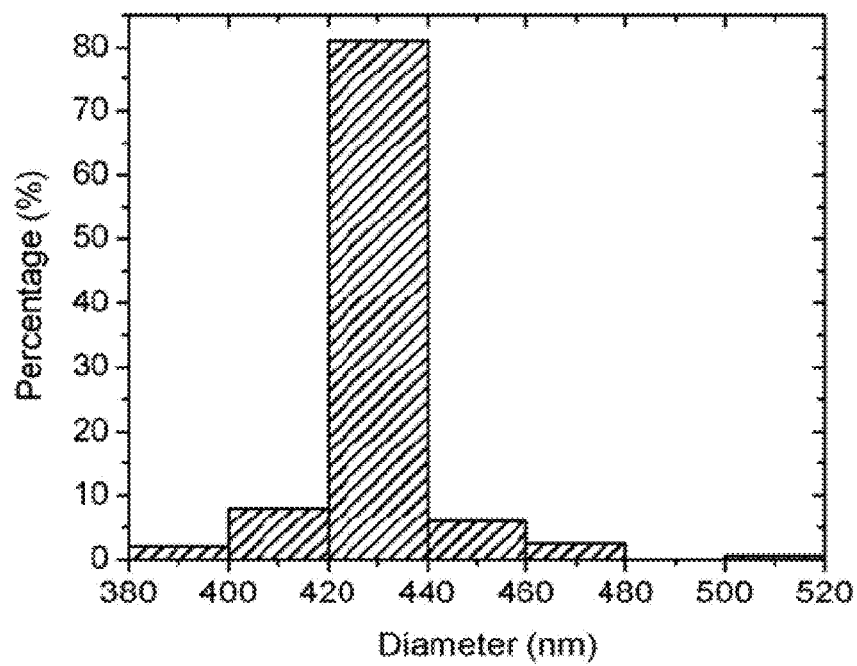
FIG. 18. Size distribution of hollow sulfur nanoparticles, based on counting over 200 particles from SEM images.

Size Distribution of Hollow Sulfur Nanoparticles:
FIG. 18 shows a size distribution of hollow sulfur nanoparticles, based on counting over 200 nanoparticles from SEM images.

Figure 19:
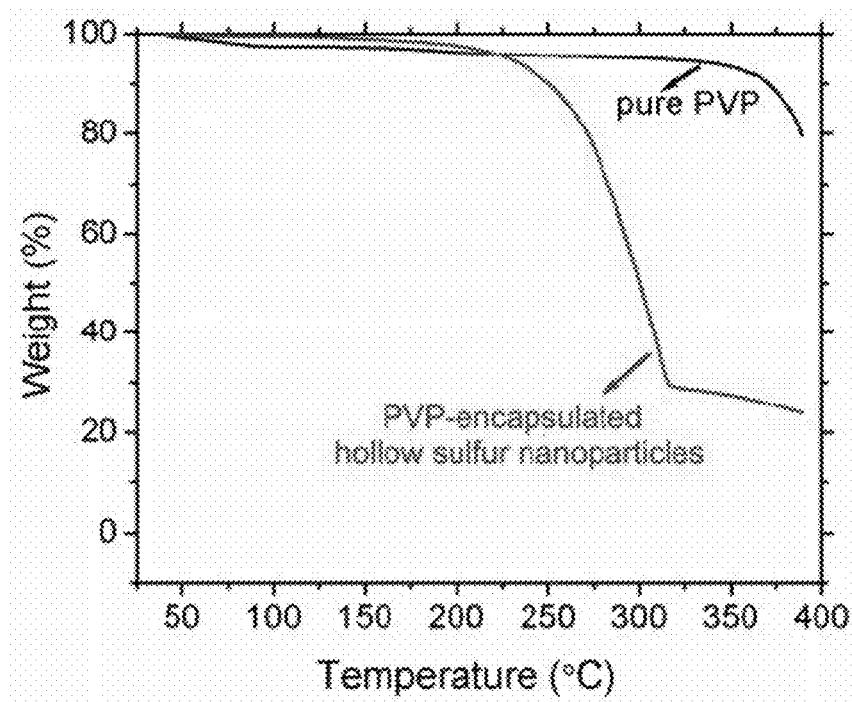
FIG. 19. Thermal gravimetric analysis ("TGA") curve of as-prepared polymer-encapsulated hollow sulfur nanoparticles recorded in the range of 40-400° C. in argon at a heating rate of about 2° C./min, showing that an amount of elemental sulfur in the sample is about 70.4 wt %. Another curve is for a control sample of pure polymer powder under the same experimental condition.

Thermal Gravimetric Analysis:
FIG. 19 shows a TGA curve of as-prepared PVP-encapsulated hollow sulfur nanoparticles recorded in the range of 40-400° C. in argon at a heating rate of about 2° C./min, showing that the amount of elemental sulfur in the sample is about 70.4 wt %.

Figure 20:
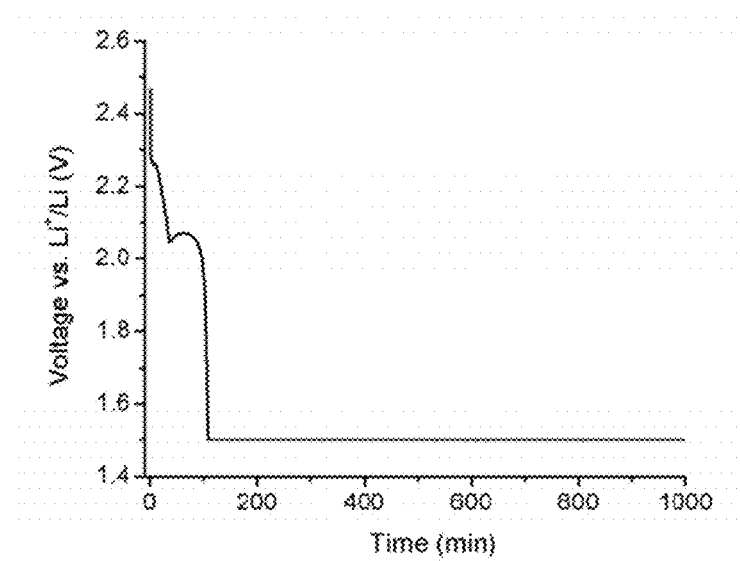
FIG. 20. Voltage profile of a pouch cell assembled in an argon-filled glovebox using a carbon-fiber paper with polymer-encapsulated hollow sulfur nanoparticles as cathode and lithium foil as anode. The pouch cell was discharged at a current rate of C/5 to 1.5 V, and then the voltage was held at 1.5 V for about 18 h.

Voltage Profile:
FIG. 20 shows a voltage profile of a pouch cell assembled in an argon-filled glovebox using a carbon-fiber paper with PVP-encapsulated hollow sulfur nanoparticles as cathode and lithium foil as anode.

Discharge/Charge Profile:
FIG. 21 shows a typical discharge/charge profiles of a cell made from PVP-encapsulated hollow sulfur nanoparticles at 1 C rate.

Example 3

Sulfur-TiO$_2$ Yolk-Shell Nanostructures

This example describes the implementation of a sulfur-TiO$_2$ yolk-shell nanoarchitecture for stable and prolonged cycling over 1,000 charge/discharge cycles in lithium-sulfur batteries. An advantage of the yolk-shell morphology lies in the presence of an internal void space to accommodate a relatively large volumetric expansion of sulfur during lithiation, thus preserving a structural integrity of a shell to mitigate against polysulfide dissolution. In comparison with bare sulfur and sulfur-TiO$_2$ core-shell nanoparticles, the yolk-shell nanostructures are found to exhibit a high capacity retention due to the effectiveness of the intact TiO$_2$ shell in restricting polysulfide dissolution. Using the yolk-shell nanoarchitecture, an initial specific capacity of about 1,030 mAh/g at ½ C rate and a Coulombic efficiency of about 98.4% over 1,000 cycles was achieved. Moreover, the capacity decay at the end of 1,000 cycles was found to be as small as about 0.033% per cycle (3.3% per 100 cycles).

Figure 22:
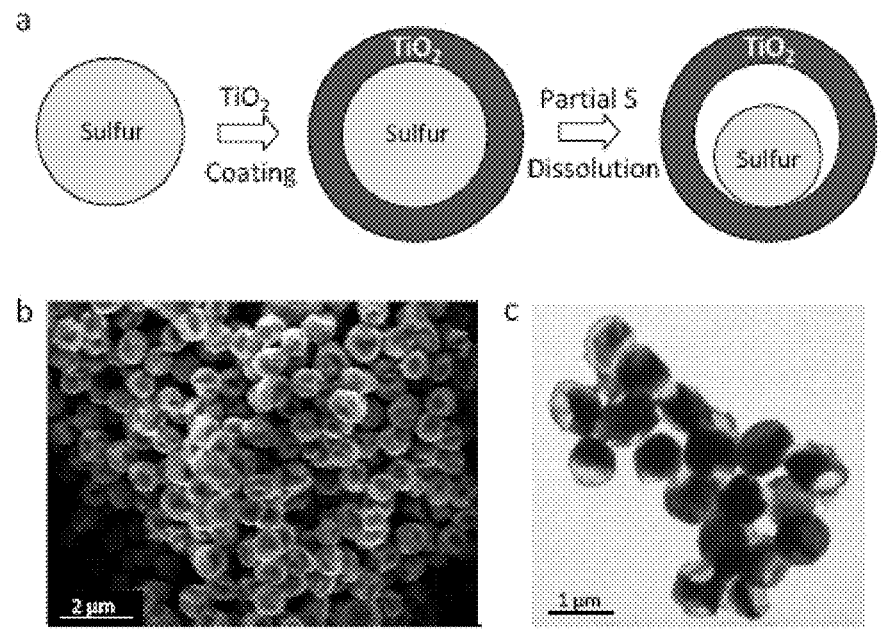
FIG. 22. Synthesis and characterization of sulfur-$TiO_2$ yolk-shell nanostructures. (a) Schematic of the synthetic process which involves coating of sulfur nanoparticles with $TiO_2$ to form sulfur-$TiO_2$ core-shell nanostructures, followed by partial dissolution of sulfur in toluene to achieve the yolk-shell morphology. (b) SEM image and (c) TEM image of as-synthesized sulfur-$TiO_2$ yolk-shell nanostructures. Through large-ensemble measurements, the average nanoparticle size and $TiO_2$ shell thickness were determined to be about 800 nm and about 15 nm, respectively.
Figure 25:
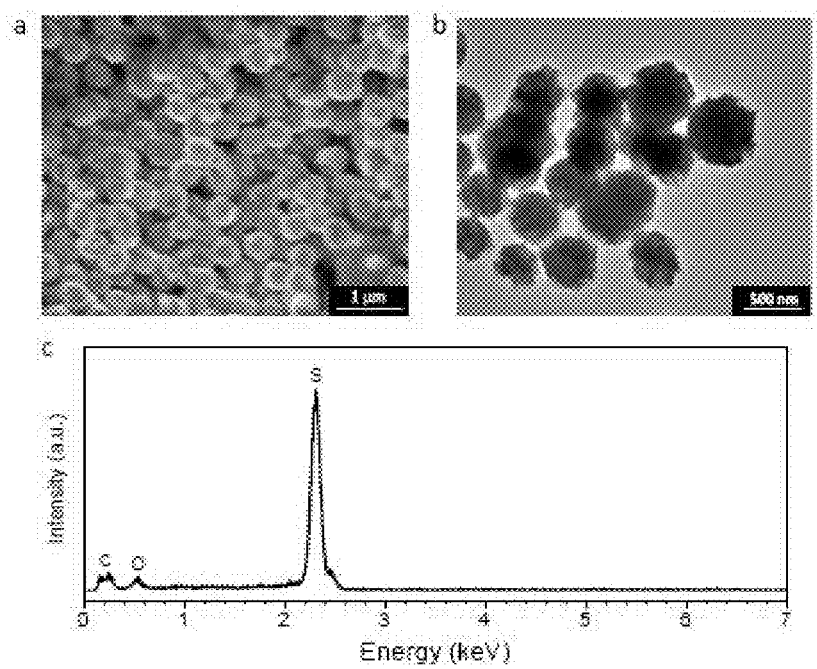
FIG. 25. (a) SEM image, (b) TEM image, and (c) Energy-dispersive X-ray spectrum of as-synthesized bare sulfur nanoparticles.
Figure 26:
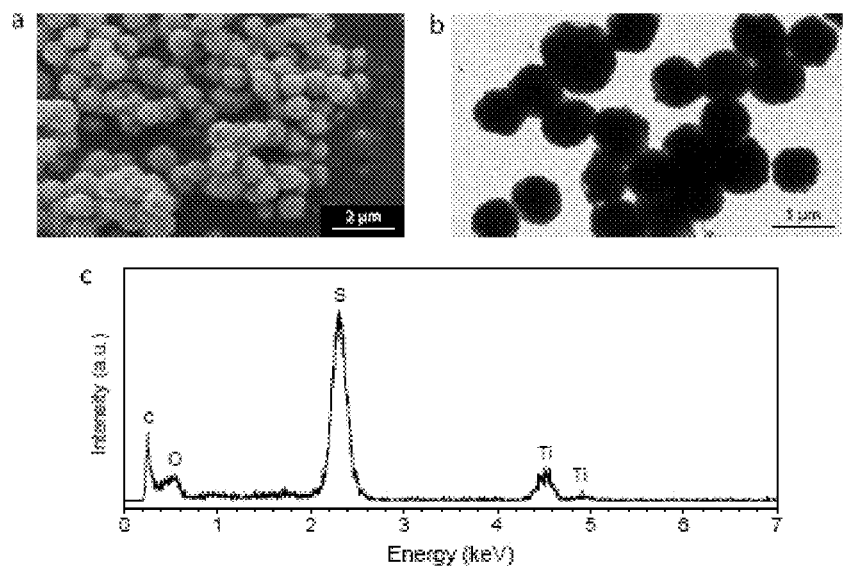
FIG. 26. (a) SEM image, (b) TEM image, and (c) Energy-dispersive X-ray spectrum of as-synthesized sulfur-$TiO_2$ core-shell nanoparticles. The $TiO_2$ shell is not clearly visible in this case because it is relatively thin compared to the size of the entire nanoparticle.
Figure 27:
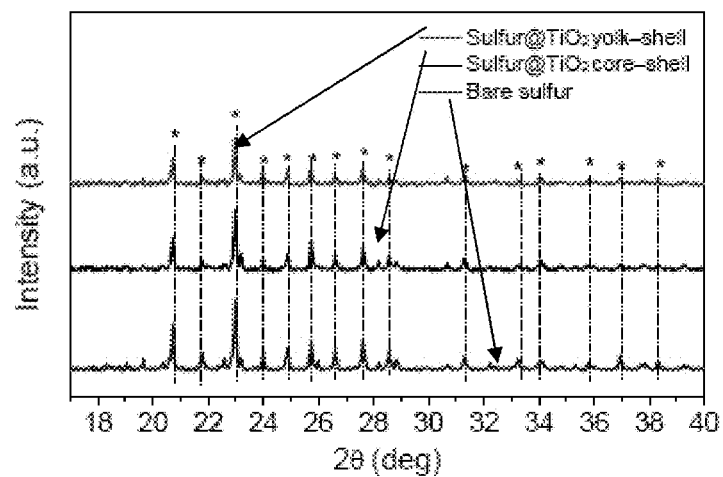
FIG. 27. X-ray diffraction patterns of bare sulfur, sulfur-$TiO_2$ core-shell nanoparticles, and sulfur-$TiO_2$ yolk-shell nanoparticles. In the sulfur-$TiO_2$ core-shell and yolk-shell particles, the diffraction peaks of sulfur (marked with asterisks) were observed but not those of $TiO_2$, indicating the amorphous nature of $TiO_2$.

The sulfur-TiO$_2$ yolk-shell morphology was experimentally realized as shown schematically in FIG. 22a. First, substantially monodisperse sulfur nanoparticles were prepared using the reaction of sodium thiosulfate with hydrochloric acid (FIG. 25). The sulfur nanoparticles were then coated with TiO$_2$ through controlled hydrolysis of a sol-gel precursor, titanium diisopropoxide bis(acetylacetonate), in an alkaline isopropanol/aqueous solution, resulting in the formation of sulfur-TiO$_2$ core-shell nanoparticles (FIG. 26; a TEM image was taken immediately after an electron beam was turned on to avoid sublimation of sulfur under the beam). This was followed by partial dissolution of sulfur in toluene to create an empty space between the sulfur core and the $TiO_2$ shell, resulting in the yolk-shell morphology. The ability of toluene to diffuse through the $TiO_2$ shell to partially dissolve sulfur indicates its porous nature. A SEM image in FIG. 22b shows relatively uniform spherical nanoparticles of about 800 nm in size. A TEM image in FIG. 22c, taken immediately after the electron beam was turned on, shows sulfur nanoparticles encapsulated within $TiO_2$ shells (about 15 nm thick) with internal void space. Due to the two-dimensional projection nature of TEM images, the void space appears as an empty area or an area of lower intensity depending on the orientation of the particles (FIG. 22c). The $TiO_2$ in the yolk-shell nanostructures were determined to be amorphous using X-ray diffraction (FIG. 27).

Figure 28:
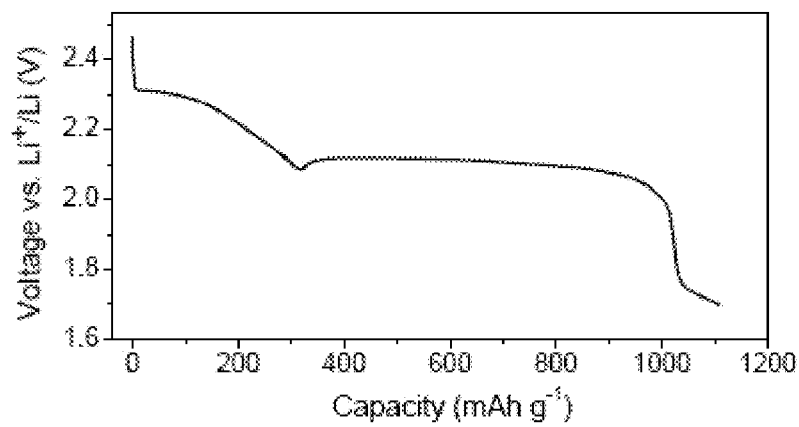
FIG. 28. Voltage profile of a pouch cell assembled using sulfur-$TiO_2$ yolk-shell nanoparticles on carbon-fiber paper as the working electrode and lithium foil as the counter electrode. The cell was discharged at 0.1 C to a voltage of 1.7 V, and the voltage was maintained for over 20 h.

Next, the effectiveness of the yolk-shell morphology was investigated in terms of accommodating the volume expansion of sulfur and restricting polysulfide dissolution. The sulfur-$TiO_2$ yolk-shell nanostructures were drop-cast onto conducting carbon-fiber papers to form working electrodes, and pouch cells were assembled using lithium foil as the counter electrode. The cells were discharged at 0.1 C rate (1 C=1,673 mA/g) to a voltage of 1.7 V vs. Li+/Li, during which a capacity of about 1,110 mAh/g was attained (FIG. 28), and the voltage was maintained for over 20 h. The as-obtained discharge profile shows the typical two-plateau behavior of sulfur cathodes, indicating the conversion of elemental sulfur to long-chain lithium polysulfides ($Li_2S_n$, $4 \leq n \leq 8$) at about 2.3 V, and the subsequent formation of $Li_2S_2$ and $Li_2S$ at about 2.1 V (FIG. 28). After the lithiation process, the contents of the cells (cathode, anode, and separator) were washed with 1,3-dioxolane solution for further characterization. This polysulfide-containing solution was then oxidized with concentrated $HNO_3$ and diluted with deionized water for analysis of sulfur content using inductively coupled plasma spectroscopy ("ICP"). For comparison, electrode materials were also prepared using bare sulfur and sulfur-$TiO_2$ core-shell nanoparticles and subjected to the same treatment.

Figure 23:
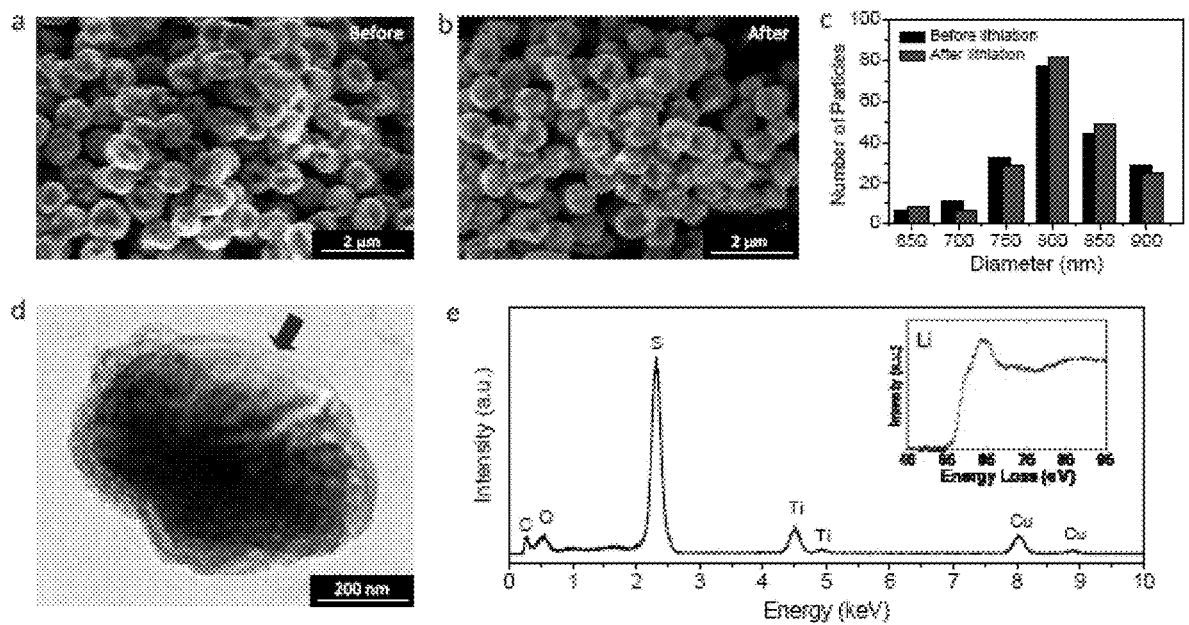
FIG. 23. Morphology of sulfur-$TiO_2$ yolk-shell nanostructures after lithiation. (a-c) SEM images of sulfur-$TiO_2$ yolk-shell nanostructures (a) before and (b) after lithiation and (c) their respective particle size distributions. (d) TEM image of a sulfur-$TiO_2$ yolk-shell nanostructure after lithiation, showing the presence of an intact $TiO_2$ shell (highlighted by arrow). (e) Energy-dispersive X-ray spectrum and electron energy loss spectrum (inset) of the nanostructure in (d), showing the presence of lithiated sulfur and $TiO_2$. The Cu peak arises due to the use of a copper TEM grid.
Figure 29:
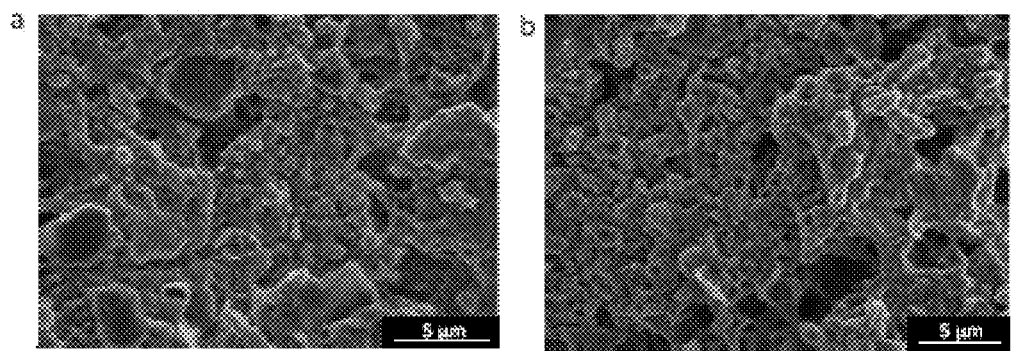
FIG. 29. SEM images of (a) bare sulfur and (b) sulfur-$TiO_2$ core-shell nanoparticles after lithiation, showing random precipitation of irregularly-shaped $Li_2S_2$ and $Li_2S$ particles on the electrodes due to dissolution of lithium polysulfides into the electrolyte.

There was little change in morphology and size distribution of the sulfur-$TiO_2$ yolk-shell nanostructures before and after lithiation (FIGS. 23a-c). A TEM image of a lithiated yolk-shell nanostructure shows a structurally intact $TiO_2$ coating (FIG. 23d), indicating the ability of the yolk-shell morphology in accommodating the volume expansion of sulfur. The presence of lithiated sulfur and $TiO_2$ in the yolk-shell nanostructure was confirmed using energy-dispersive X-ray spectroscopy and electron energy loss spectroscopy (FIG. 23e). In the case of bare sulfur and sulfur-$TiO_2$ core-shell nanoparticles, random precipitation of irregularly-shaped $Li_2S_2$ and $Li_2S$ particles was observed on the electrodes due to dissolution of lithium polysulfides into the electrolyte (FIG. 29). ICP analysis showed a loss of about 81% and about 62% of the total sulfur mass into the electrolyte for the bare sulfur and sulfur-$TiO_2$ core-shell nanoparticles, respectively. In comparison, about 19% of the total sulfur mass was found to be dissolved in the electrolyte in the case of the yolk-shell nanostructures, which indicates the effectiveness of the intact $TiO_2$ shell in restricting polysulfide dissolution.

Figure 30:
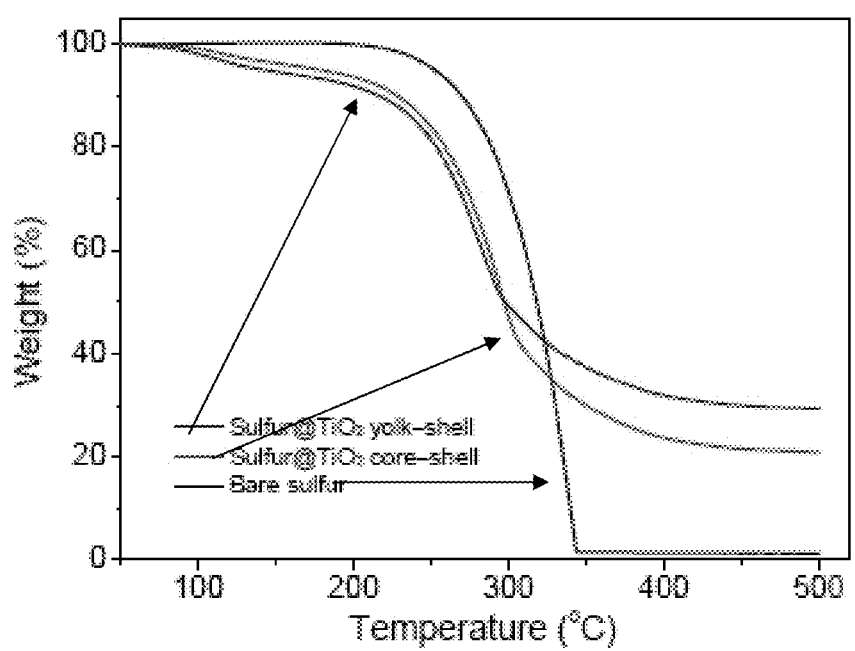
FIG. 30. TGA of bare sulfur, sulfur-$TiO_2$ core-shell nanoparticles, and sulfur-$TiO_2$ yolk-shell nanoparticles. The wt % of sulfur in these 3 samples were determined to be about 99%, about 79%, and about 71%, respectively.

To further evaluate the electrochemical cycling performance of the sulfur-$TiO_2$ yolk-shell nanoarchitecture, 2032-type coin cells were fabricated. The working electrodes were prepared by mixing the yolk-shell nanostructures with conductive carbon black and polyvinylidene fluoride binder in N-methyl-2-pyrrolidinone to form a slurry, which was then coated onto an aluminum foil and dried under vacuum. Using a lithium foil as the counter electrode, the cells were cycled from 1.7-2.6 V vs. Li+/Li. The electrolyte used was lithium bis(trifluoromethanesulfonyl)imide in 1,2-dimethoxyethane and 1,3-dioxolane, with $LiNO_3$ (1 wt %) as an additive to passivate a surface of the lithium anode. Specific capacity values were calculated based on the mass of sulfur, which was determined using TGA (FIG. 30). The sulfur content was found to be about 71 wt % in the yolk-shell nanostructures, accounting for about 53 wt % of the electrode mix, and with a typical sulfur mass loading of about 0.4-0.6 mg/cm². The contribution of $TiO_2$ to the total capacity is relatively small in the voltage range of this example.

Figure 24:
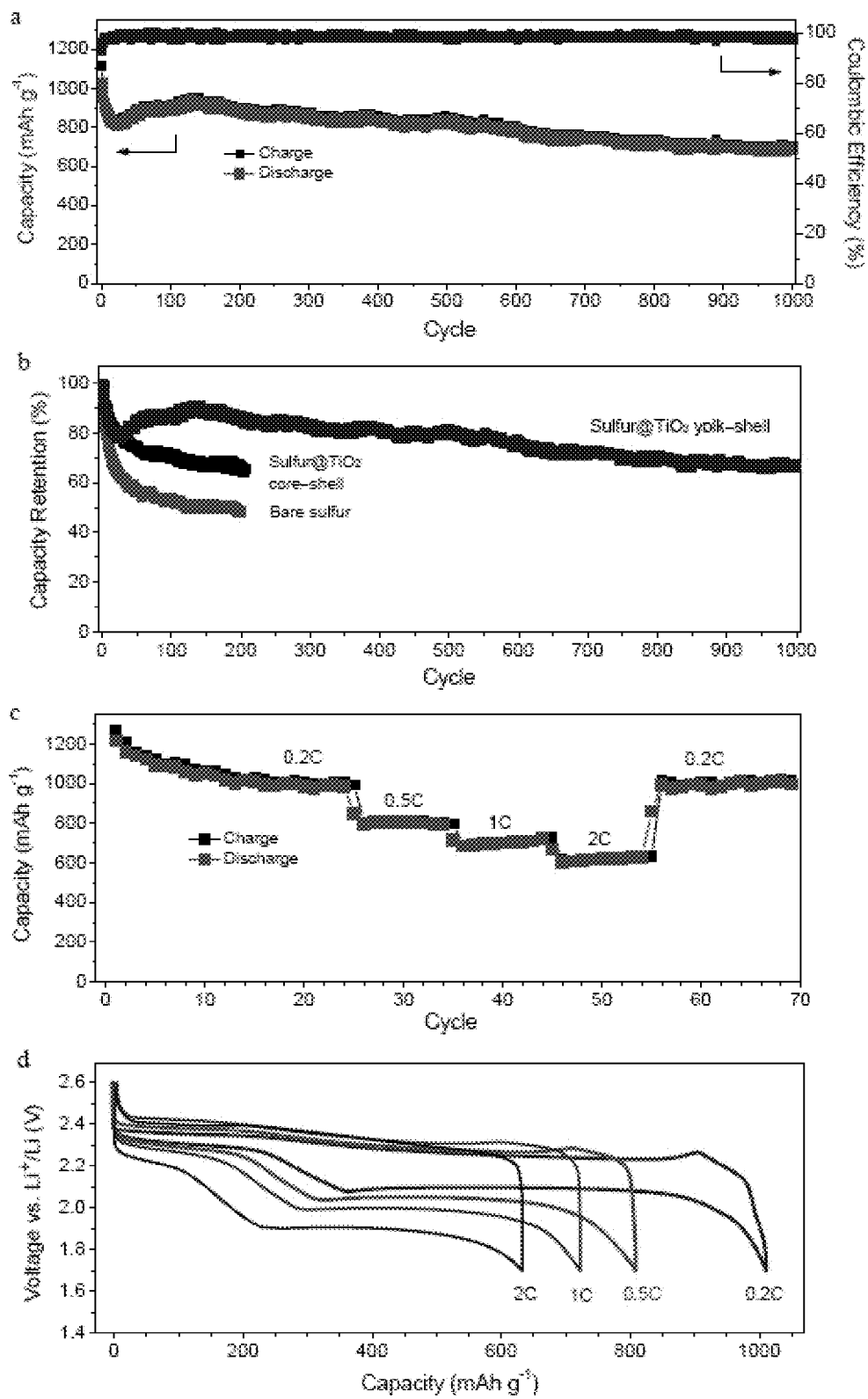
FIG. 24. Electrochemical performance of sulfur-$TiO_2$ yolk-shell nanostructures. (a) Charge/discharge capacity and Coulombic efficiency over 1,000 cycles at 0.5 C. (b) Capacity retention of sulfur-$TiO_2$ yolk-shell nanostructures cycled at 0.5 C, in comparison with bare sulfur and sulfur-$TiO_2$ core-shell nanoparticles. (c) Charge/discharge capacity and (d) voltage profiles of sulfur-$TiO_2$ yolk-shell nanostructures cycled at various C-rates from 0.2 C to 2 C. Specific capacity values were calculated based on the mass of sulfur.
Figure 31:
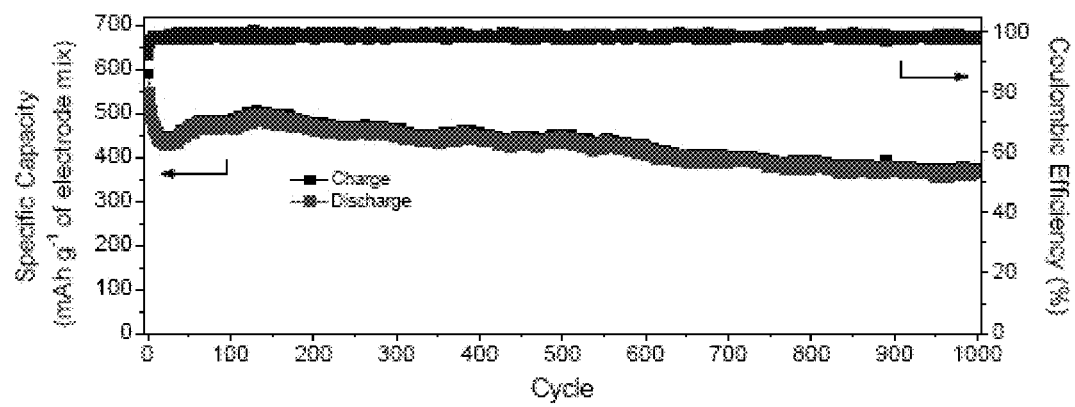
FIG. 31. Charge/discharge capacity and Coulombic efficiency of sulfur-$TiO_2$ yolk-shell nanostructures in terms of mAh/g of the electrode mix over 1,000 cycles at 0.5 C.

The sulfur-$TiO_2$ yolk-shell nanoarchitecture exhibited stable cycling performance over 1,000 charge/discharge cycles at ½ C rate (1 C=1,673 mA/g) as displayed in FIG. 24a (see also FIG. 31). After an initial discharge capacity of about 1,030 mAh/g, the yolk-shell nanostructures achieved capacity retentions of about 88%, about 87%, and about 81% at the end of 100, 200, and 500 cycles, respectively (FIGS. 24a-b). Moreover, after prolonged cycling over 1,000 cycles, the capacity retention was found to be about 67%, which corresponds to a small capacity decay of about 0.033% per cycle (about 3.3% per 100 cycles). The average Coulombic efficiency over the 1,000 cycles was calculated to be about 98.4% (FIG. 24a), which shows little shuttle effect due to polysulfide dissolution. In comparison, cells based on bare sulfur and sulfur-$TiO_2$ core-shell nanoparticles suffered from rapid capacity decay, showing capacity retentions of about 48% and about 66% respectively after 200 cycles (FIG. 24b), indicating a greater degree of polysulfide dissolution into the electrolyte.

Figure 32:
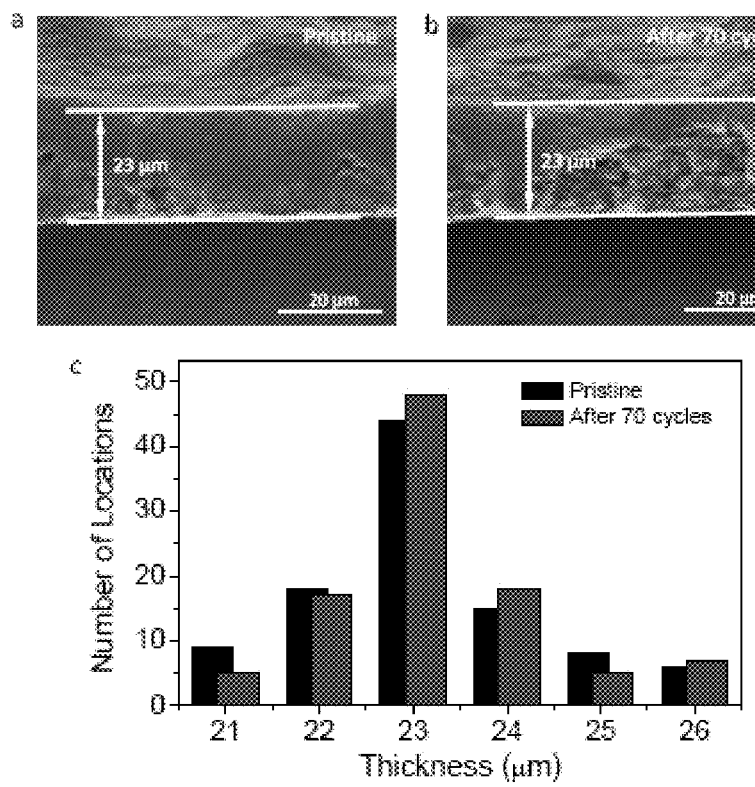
FIG. 32. SEM images of the electrode cross-section of sulfur-$TiO_2$ yolk-shell nanoparticles (a) before and (b) after 70 cycles at the various C-rates shown in FIG. 24c. (c) Their corresponding distributions in electrode thickness, showing little change in thickness before and after 70 cycles.

Next, the sulfur-$TiO_2$ yolk-shell nanostructures were subjected to cycling at various C-rates to evaluate their robustness (FIGS. 24c-d). After an initial discharge capacity of about 1,215 mAh/g at 0.2 C rate, the capacity was found to stabilize at about 1,010 mAh/g. Further cycling at 0.5 C, 1 C, and 2 C showed high reversible capacities of about 810 mAh/g, about 725 mAh/g, and about 630 mAh/g, respectively (FIGS. 4c-d). When the C-rate was switched abruptly from 2 C to 0.2 C again, the original capacity was largely recovered (FIG. 24c), indicating robustness and stability of the cathode material. Moreover, there was little change in the thickness of the cathode before and after 70 cycles at these various C-rates (FIG. 32), which further confirms the ability of the yolk-shell nanostructures in accommodating the volume expansion of sulfur.

There are at least two characteristics of a yolk-shell design that impart the sulfur-$TiO_2$ nanostructures with stable cycling performance over 1,000 charge/discharge cycles. First, sufficient empty space is present to allow for volume expansion of sulfur. Using image processing software on the yolk-shell nanostructures (FIG. 22c), sulfur was determined to occupy about 62% of the volume within the $TiO_2$ shell, which corresponds to about 38% internal void space. This value is supported by TGA of the relative wt % of sulfur vs. $TiO_2$ (FIG. 30), from which the volume of empty space in the yolk-shell nanostructures was estimated to be about 37%. This volume of void space can accommodate about 60% volume expansion of the sulfur present within the shell, allowing for about 1,250 mAh/g, namely about 75% of the maximum theoretical capacity of sulfur (assuming volume expansion is linearly dependent on the degree of lithiation). Experimentally, a maximum discharge capacity of about 1,215 mAh/g has been achieved (FIG. 24c); therefore, there is sufficient void space for volume expansion without causing the shell to crack and fracture. Second, the intact $TiO_2$ shell is effective in mitigating against polysulfide dissolution. The ability of toluene to diffuse through the $TiO_2$ shell to partially dissolve sulfur (FIG. 22a) indicates the porous (<2 nm) nature of the shell, which is typical of amorphous $TiO_2$ prepared using sol-gel methods. The stable cycling performance demonstrated in this example indicates that the $TiO_2$ shell is effective in restricting polysulfide dissolution due to its small pore size and the presence of hydrophilic Ti—O groups that can bind favorably with polysulfide anions.

By way of summary, this example demonstrates the design of a sulfur-$TiO_2$ yolk-shell nanoarchitecture for long cycling capability over 1,000 charge/discharge cycles, with a capacity decay as small as about 0.033% per cycle. Compared to bare sulfur and sulfur-$TiO_2$ core-shell counterparts, the yolk-shell nanostructures exhibited the highest capacity retention due to the presence of internal void space to accommodate the volume expansion of sulfur during lithiation, resulting in an intact shell to restrict polysulfide dissolution.

Synthesis of Sulfur-$TiO_2$ Yolk-Shell Nanostructures:

First, sulfur nanoparticles were synthesized by adding concentrated HCl (0.8 mL, 10 M) to an aqueous solution of $Na_2S_2O_3$ (100 mL, 0.04 M) including a low concentration of polyvinylpyrrolidone (PVP, MW of about 55,000, 0.02 wt %). After reaction for about 2 h, the sulfur nanoparticles (100 mL) were washed by centrifugation and redispersed into an aqueous solution of PVP (20 mL, 0.05 wt %). For $TiO_2$ coating, the solution of sulfur nanoparticles (20 mL) was mixed with isopropanol (80 mL) and concentrated ammonia (2 mL, 28 wt %). Titanium diisopropoxide bis (acetylacetonate) (50 mL, 0.01 M in isopropanol) was then added in five portions (5×10 mL) at about half-hour intervals. After reaction for about 4 h, the solution of sulfur-$TiO_2$ core-shell nanoparticles was washed by centrifugation to remove freely-hydrolyzed $TiO_2$, followed by redispersion into deionized water (20 mL). To prepare the sulfur-$TiO_2$ yolk-shell nanostructures, the solution of core-shell particles (20 mL) was stirred with isopropanol (20 mL) and toluene (0.4 mL) for about 4 h to achieve partial dissolution of sulfur. The as-synthesized sulfur-$TiO_2$ yolk-shell nanostructures were then recovered using centrifugation and dried under vacuum overnight.

Characterization:

SEM and TEM images were taken using a FEI XL30 Sirion SEM (accelerating voltage 5 kV) and a FEI Tecnai G2 F20 X-TWIN (accelerating voltage 200 kV), respectively. Elemental analysis was performed using energy-dispersive X-ray spectroscopy and electron energy loss spectroscopy equipped in the TEM device. X-ray diffraction patterns were obtained on a PANalytical X'Pert Diffractometer using Cu Kα radiation. TGA was carried out using a Netzsch STA 449 at a heating rate of about 2° C./min under argon atmosphere. ICP optical emission spectroscopy was performed using a Thermo Scientific ICAP 6300 Duo View Spectrometer.

Electrochemical Measurements:

To prepare working electrodes, various sulfur-based materials were mixed with carbon black (Super P) and polyvinylidene fluoride (PVDF) binder (75:15:10 by weight) in N-methyl-2-pyrrolidinone (NMP) to form a slurry. This slurry was then coated onto an aluminum foil using doctor blade and dried under vacuum to form a working electrode. 2032-type coin cells were assembled in an argon-filled glove box using a lithium foil as the counter electrode. The electrolyte used was a solution of lithium bis(trifluoromethanesulfonyl)imide (LiTFSI, 1 M) in 1:1 v/v 1,2-dimethoxyethane (DME) and 1,3-dioxolane (DOL) including $LiNO_3$ (1 wt %). Galvanostatic cycling was carried out using a 96-channel battery tester (Arbin Instruments) from 1.7-2.6 V vs. Li+/Li. Specific capacity values were calculated based on the mass of sulfur in the samples, which was determined using TGA (FIG. 30). The sulfur content was found to be about 71 wt % in the yolk-shell nanostructures, accounting for about 53 wt % of the electrode mix, with a typical sulfur mass loading of about 0.4-0.6 mg/cm$^2$.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

What is claimed is:

1. A method of forming a cathode material, comprising:
   providing a sulfur-based nanostructure;
   coating the nanostructure with an encapsulating material to form a shell surrounding the nanostructure; and
   removing a portion of the nanostructure through the shell to form a void within the shell, with a remaining portion of the nanostructure disposed within the shell.

2. The method of claim 1, wherein the shell includes a wall that is porous.

3. The method of claim 1, wherein removing the portion of the nanostructure is performed by partial dissolution of the nanostructure in a solvent.

4. The method of claim 1, wherein a volume of the void is at least 1/3 of an internal volume of the shell.

5. The method of claim 1, wherein a volume of the void is at least 2/3 of an internal volume of the shell.

* * * * *

UNITED STATES PATENT AND TRADEMARK OFFICE
CERTIFICATE OF CORRECTION

PATENT NO. : 10,566,630 B2
APPLICATION NO. : 16/039165
DATED : February 18, 2020
INVENTOR(S) : Weiyang Li et al.

It is certified that error appears in the above-identified patent and that said Letters Patent is hereby corrected as shown below:

In the Specification

In Column 1, after the title "STATEMENT REGARDING FEDERALLY SPONSORED RESEARCH OR DEVELOPMENT," replace the existing paragraph with the following paragraph:
--This invention was made with Government support under contract DE-AC02-76SF00515 awarded by the Department of Energy. The Government has certain rights in the invention.--

Signed and Sealed this
Tenth Day of September, 2024

Katherine Kelly Vidal
*Director of the United States Patent and Trademark Office*